(12) United States Patent
Zhou et al.

(10) Patent No.: US 8,467,269 B2
(45) Date of Patent: Jun. 18, 2013

(54) APPARATUS, SYSTEMS AND METHODS FOR ENHANCED DETECTION, SYNCHRONIZATION AND ONLINE DOPPLER SCALE ESTIMATION FOR UNDERWATER ACOUSTIC COMMUNICATIONS

(75) Inventors: Shengli Zhou, Mansfield, CT (US);
Peter Willett, Coventry, CT (US);
Christian Berger, Pittsburgh, PA (US);
Sean Mason, Nashua, NJ (US)

(73) Assignee: University of Connecticut, Farmington, CT (US)

( * ) Notice: Subject to any disclaimer, the term of this patent is extended or adjusted under 35 U.S.C. 154(b) by 395 days.

(21) Appl. No.: 12/752,239

(22) Filed: Apr. 1, 2010

(65) Prior Publication Data
US 2011/0013487 A1 Jan. 20, 2011

Related U.S. Application Data
(60) Provisional application No. 61/166,442, filed on Apr. 3, 2009.

(51) Int. Cl.
*H04B 11/00* (2006.01)
*G01V 1/18* (2006.01)

(52) U.S. Cl.
USPC .......................................................... 367/134

(58) Field of Classification Search
USPC .......................................... 367/134, 131, 178
See application file for complete search history.

(56) References Cited

U.S. PATENT DOCUMENTS

| | | | |
|---|---|---|---|
| 5,732,113 A | 3/1998 | Schmidl et al. | |
| 2007/0071077 A1* | 3/2007 | Yang | 375/218 |
| 2011/0013487 A1* | 1/2011 | Zhou et al. | 367/131 |

OTHER PUBLICATIONS

Weiss, Wavelets and Wideband Correlation Processing, IEEE Signal Processing Mag., vol. 11, No. 1, pp. 13-32, Jan. 1994.
Conway, et al., Packing Lines, Planes, etc.: Packings in Grassmannian Space, Experimental Math., vol. 5, No. 2, pp. 139-159, 1996.
Niu, et al., Wavelet Based Approach for Joint Time Delay and Doppler Stretch Measurements, IEEE Trans Aerosp. Electron. Syst., vol. 35, No. 3, pp. 1111-1119, Jul. 1997.
Schmidl et al., Robust Frequency and Timing Synchronization for OFDM, IEEE Trans. Commun., vol. 45, No. 12, pp. 1613-1621, Dec. 1997.
Giunta, Fast Estimators Oftime Delay and Doppler Stretch Based on Discrete-Time Methods, IEEE Trans.Signal Processing, vol. 46, No. 7, pp. 1785-1797, Jul. 1998.
Van Nee, et al., New High-Rate Wireless LAN Standards, IEEE Communications Magazine, vol. 37, No. 12, pp. 82-88, Dec. 1999.

(Continued)

*Primary Examiner* — Daniel Pihulic
(74) *Attorney, Agent, or Firm* — McCarter & English, LLP

(57) ABSTRACT

Advantageous online and/or real-time OFDM-based underwater acoustic (UWA) apparatus, systems and methods are provided according to the present disclosure. The apparatus, systems and methods employ a receiver with a bank of parallel branches, with each branch having a self-correlator matched to a different waveform scaling factor. A detection is declared when any of the branches leads to a correlation metric larger than a pre-defined threshold. The branch with the largest metric yields a Doppler scale estimate and a coarse synchronization point. The proposed apparatus, systems and methods use one OFDM preamble, thereby avoiding the need to buffer the whole data packet before data demodulation and enabling online and/or real-time operation. Thus, the disclosed apparatus, systems and methods are advantageously applicable to UWA communications.

41 Claims, 11 Drawing Sheets

OTHER PUBLICATIONS

Kilfoyle et al., The State of Art in Underwater Acoustic Telemetry, IEE Journal of Oceanic Engineering, vol. 25, No. 1, pp. 4-27, Jan. 2000.

Sheriff et al., A Computationally Efficient Doppler Compensation System for Underwater Acoustic Communications, IEEE J. Ocean Eng., vol. 25, No. 1, pp. 52-61, Jan. 2000.

Larsson, et al., Joint Symbol Timing and Channel Estimation for OFDM Based WLANs, IEEE Commun. Lett., vol. 5, No. 8, pp. 325-327, Aug. 2001.

Sibul et al., A Wideband Wavelet Based Estimator Correlator and Its Properties, Multidimensional Systems and Signal Processing, vol. 13, No. 2, pp. 157-186, Apr. 2002.

Minn, et al., A Robust Timing and Frequency Synchronization for OFDM Systems, IEEE Trans. Wireless Commun., vol. 2, No. 4, pp. 822-839, Jul. 2003.

Stojanovic, Low Complexity ofDM Detector for Underwater Channels, in Proc. of MTS/IEEE Oceans Conference, Boston, MA, Sep. 18-21, 2006.

Mason, et al., A Broadband Underwater Acoustic Modem Implementation Using Coherent OFDM, in Proc. National Conference for Undergraduate Research (NCUR), San Rafael, California, Apr. 2007.

Jacobsen et al., Fast, Accurate Frequency Estimators [DSP Tips & Tricks], IEEE Signal Processing Magazine, vol. 24, No. 3, pp. 123-125, May 2007.

Yan, et al.i, A DSP Implementation of DM Acoustic Modem, in Proc. of the ACM International Workshop on Under Water Networks (WUWNet), Montreal, Quebec, Canada, Sep. 2007.

Li, et al., Multicarrier Communications Over Underwater Acoustic Channels With Nonuniform Doppler Shifts, IEEE J Oceanic Eng., vol. 33, No. 2, Apr. 2008.

Berger, et al., Performance Analysis on an MAP Fine Timing Algorithm in UWB Multiband OFDM, IEEE Trans. Commun, 2008.

Mason, et al., Detection, Synchronization, and Doppler Scale Estimation with Multicarrier Waveforms in Underwater Acoustic Communication, IEEE Journal on Selected Areas in Communications, vol. 26, No. 9, Dec. 2008.

* cited by examiner

APPARATUS, SYSTEMS AND METHODS FOR ENHANCED DETECTION, SYNCHRONIZATION AND ONLINE DOPPLER SCALE ESTIMATION FOR UNDERWATER ACOUSTIC COMMUNICATIONS

CROSS-REFERENCE TO RELATED APPLICATIONS

This application claims the benefit of U.S. Provisional App. Ser. No. 61/166,442 filed Apr. 3, 2009, the entire contents of which is herein incorporated by reference in its entirety.

STATEMENT OF GOVERNMENT SUPPORT

The United States government may hold license and/or other rights in this disclosure as a result of financial support provided by governmental agencies in the development of aspects of the disclosure. Parts of this work were supported by the following grants from the Office of Naval Research, Grant Nos.: N00014-07-1-0805, N00014-07-1-0055 and N00014-07-1-0429, and grants from the National Science Foundation, Grant Nos.: ECS-0725562 and CNS-0721834.

BACKGROUND

1. Technical Field

The present disclosure relates to the field of underwater acoustic (UWA) communications. More particularly, the present disclosure relates to detection, synchronization and/or online or real-time Doppler scale estimation of UWA communications.

2. Background Art

In general, underwater acoustic (UWA) communication (e.g., the sending and/or receiving of acoustic signals underwater) is a difficult and complex process. The unique characteristics of water as a propagation medium typically contributes to the problematic nature of UWA communication. For example, due to factors such as multi-path propagation and time variations of the channel, it is necessary to account for, inter alia, small available bandwidth and strong signal attenuation. Moreover, slow propagation speeds typically associated with acoustic signals may lead to significant Doppler shifts and spreading. Thus, UWA communication systems are often times limited by reverberation and time variability beyond the capability of receiver algorithms.

Unlike the development of wireless networks over radio channels, the development of underwater communication systems has generally occurred at a much slower pace. For operational reasons and due to concerns of battery life, it is typically important that underwater acoustic receivers be activated only by the presence of a signal to receive and demodulate. In general, when a signal is received, it is important that the receiver synchronize itself to the beginning of the message. Since relative transmitter/receiver motion can cause a dilation or compression of the message signal (i.e., Doppler), this time-scaling should be estimated and/or synchronized. Synchronization has typically entailed transmission of a known preamble prior to the data, which can be detected by the receiver. In general, existing preambles in underwater telemetry are almost exclusively based on linearly frequency modulated (LFM) signals, also known as Chirp signals. See, e.g., D. B. Kilfoyle and A. B. Baggeroer, "The state of the art in underwater acoustic telemetry," IEEE Journal of Oceanic Engineering, Vol. 25, No. 1, pp. 4-27, January 2000.

LFM signals are commonly used because LFM signals typically have a desirable ambiguity function in both time and frequency—which matches well to the underwater channel and is characterized by its large Doppler spread. However, typical receiver algorithms are matched filter based, and attempt to synchronize a known template to the signal coming from one strong path and suppress other interfering paths. However, this approach suffers from at least the following two deficiencies: (1) the noise level at the receiver has to be constantly estimated to achieve a constant false alarm rate (CFAR) (usually accomplished using order statistics); and (2) performance will degrade in the presence of dense and unknown multipath channels.

Due to the slow propagation speed of acoustic waves, the compression or dilation effect on the time domain waveform must be considered explicitly. In general, once a Doppler scale estimate is obtained, a resampling procedure is typically applied before data demodulation. See, e.g., B. S. Sharif, J. Neasham, O. R. Hinton, and A. E. Adams, "A computationally efficient Doppler compensation system for underwater acoustic communications," IEEE J. Ocean. Eng., vol. 25, no. 1, pp. 52-61, January 2000. One known method to estimate the Doppler scale is to use an LFM preamble and an LFM postamble around each data burst—e.g., so the receiver can estimate the change of the waveform duration. Unfortunately, this method typically estimates the average Doppler scale for the whole data burst and thus requires the whole data burst to be buffered before data demodulation—thereby preventing online real-time receiver processing.

Multicarrier modulation in the form of orthogonal frequency division multiplexing (OFDM) has prevailed in recent broadband wireless radio applications due to the low complexity of receivers required to deal with highly dispersive channels. For example, OFDM has been the workhorse modulation present in a number of practical broadband wireless systems (See, e.g., U.S. Pat. No. 5,732,113 to Schmidl et al. or T. M. Schmidl and D. C. Cox, "Robust frequency and timing synchronization for OFDM," IEEE Trans. Commun., vol. 45, no. 12, pp. 1613-1621, December 1997; H. Minn, V. Bhargava, and K. Letaief, "A robust timing and frequency synchronization for OFDM systems," IEEE Trans. Wireless Commun., vol. 2, no. 4, pp. 822-839, July 2003.), notably wireless local area networks (IEEE 802.11a/g/n) (See, e.g., R. D. J. van Nee, G. A. Awater, M. Morikura, H. Takanashi, M. A. Webster, and K. W. Halford, "New high-rate wireless LAN standards," IEEE Communications Magazine, vol. 37, no. 12, pp. 82-88, December 1999). The primary advantages of OFDM over single-carrier schemes is the ability to cope with severe channel conditions, e.g., frequency-selective fading due to multipath propagation without complex equalization filters. Channel equalization is simplified because OFDM may be viewed as using many slowly-modulated narrowband signals rather than one rapidly-modulated wideband signal. In general, a receiver can effectively correlate the received signal with a delayed version of itself, since, due to a cyclic prefix structure, the repetition pattern persists even in the presence of unknown multipath channels. The low symbol rate makes the use of a guard interval between symbols affordable, making it possible to handle time-spreading and substantially eliminate intersymbol interference (ISI). Channel equalization using OFDM is further simplified by approximating the effects of frequency-selective channel conditions as a constant for each OFDM sub-channel provided that each sub-channel is sufficiently narrow-band.

These advantages motivate the use of OFDM in underwater environments as well. However, as noted above, UWA channels are far more challenging than their radio counterparts.

Specifically, synchronization algorithms that work in wireless radio channels will not perform well, if at all, in UWA channels with large waveform expansion or compression because the repetition period changes to an unknown value. Therefore, typical apparatus, systems and methods adapted for radio communication are inadequate for UWA communication because the necessary channel scaling associated with UWA transmissions is not accounted for—e.g., because such scaling difficulties are not present in radio transmissions. The problems associated with UWA transmission and reception are not present and therefore not considered by current radio communication methods, systems and apparatus. Further, many UWA transmission schemes which attempt to overcome the difficulties associated with UWA are examined by offline data processing based on recorded experimental data.

As a result, current UWA communication systems, methods and apparatus fail to adequately detect, synchronize and Doppler scale estimate UWA communication signals in such a manner that enables online or real-time receiver operation. These and other inefficiencies and opportunities for improvement are addressed and/or overcome by the apparatus, systems and methods of the present disclosure.

SUMMARY

The present disclosure relates to apparatus, systems and methods for facilitating enhanced underwater acoustic (UWA) communications. More particularly, the present disclosure involves apparatus, systems and methods for online (e.g., real-time) receiver processing using orthogonal frequency division multiplexing (OFDM) of UWA communications. In exemplary embodiments, the apparatus, systems and methods utilize OFDM waveforms for detection, synchronization, and Doppler scale estimation for an underwater acoustic receiver (e.g., online and/or real-time underwater acoustic receiver). The disclosed approach represents a significant paradigm shift away from traditional single-carrier based UWA communications. Of note, the transmitter transmits a preamble that consists of two identical orthogonal frequency division multiplexing (OFDM) symbols preceded by a cyclic prefix (CP). OFDM divides the available bandwidth into a large number of overlapping subbands, such that the symbol duration is long compared to the multipath spread of the channel.

Exemplary embodiments of the disclosed apparatus, systems and methods adopt and/or employ zero-padded OFDM (ZP-OFDM) for application in UWA communications. See, e.g., M. Stojanovic, "Low complexity OFDM detector for underwater channels," in Proc. of MTS/IEEE OCEANS conference, Boston, Mass., Sep. 18-21, 2006; B. Li, S. Zhou, M. Stojanovic, L. Freitag, and P. Willet, "Multicarrier communications over underwater acoustic channels with nonuniform Doppler shifts," *IEEE J. Oceanic Eng.*, vol. 33, no. 2, April 2008. ZP-OFDM may be advantageously used instead of conventional cyclic prefix OFDM in order to save transmission power on the long guard interval.

In general, the disclosed apparatus, systems and methods employ a receiver that includes a bank of parallel branches, with each branch having a self-correlator matched to a different Doppler scaling factor character with respect to waveform dilation or compression. The receiver effectively correlates the received signal with a delayed version of itself because the repetition pattern in the signal persists even in the presence of unknown multipath channels due to the CP structure. Detection is declared when any of the branches leads to a correlation metric larger than a pre-defined threshold. The branch with the largest metric yields a Doppler scale estimate and a coarse synchronization point. It is noted that the utility and performance characteristics of the disclosed apparatus, systems and methods have been confirmed by an experiment conducted in shallow water. Using only one OFDM preamble, the proposed method achieved excellent performance on the Doppler scale estimation accuracy and the bit error rate and performance was at least comparable to an offline method based on LFM pre- and post-ambles. However, the proposed apparatus, systems and methods avoid the need to buffer the whole data packet before demodulation, which enables online or real-time receiver operation for multicarrier underwater acoustic communication. Further, through analysis of the impact of the Doppler scale estimation accuracy on the data transmission, guidelines are provided for the selection of the detection threshold and Doppler scale resolution.

Thus, the disclosed apparatus, systems and methods provide significant improvements over previously existing technologies for underwater acoustic communications. The proposed disclosed apparatus, systems and methods provide significant practical merits, such as accuracy, characterizable performance, reduced overhead by removal of need for postamble, and reduced need for memory (storage of the entire packet). More particularly, the advantages of the present disclosure over existing single-carrier technologies include at least: (i) a preset detection threshold that does not depend on the operating SNR, and hence avoids the dynamic threshold determination process, (ii) increased detection performance due to signal energy from multiple paths rather than only a single path, (iii) accurate online or real-time Doppler scale estimation previously unavailable with LFM based designs, (iv) allows for the use of fine timing algorithms developed for radio channels after coarse timing and resampling, and (v) a low-complexity implementation when the self-correlation metric is computed recursively. Exemplary fine timing algorithms designed for radio channels may be found, for example, in E. G. Larsson, G. Liu, J. Li, and G. B. Giannakis, "Joint symbol timing and channel estimation for OFDM based WLANs," *IEEE Commun. Lett.*, vol. 5, no. 8, pp. 325-327, August 2001, and C. R. Berger, S. Zhou, Z. Tian, and P. Willett, "Performance analysis on an MAP fine timing algorithm in UWB multiband OFDM," *IEEE Trans. Commun*, 2008.

In one embodiment, the disclosed exemplary apparatus, systems and methods provide a point estimate of the Doppler scale at the beginning of a data burst. Therefore, the proposed apparatus, systems and methods may be optimally suited for application scenarios where the Doppler scale stays constant or varies slowly during the data burst duration. When the Doppler scale changes fast, the point estimates need to be frequently updated, e.g., by shortening of the data burst, or, through the use of a tracking algorithm based on point estimates available via inserting multiple synchronization blocks into a long data burst at regular intervals.

Further, compared with prior LFM based approaches, the disclosed apparatus, systems and methods are better suited to handle the presence of dense multipath channels. Still further, the disclosed exemplary apparatus, systems and methods do not require the buffering of the whole data packet before data demodulation, which facilitates an online real-time receiver for multicarrier UWA communications. Thus, the disclosed apparatus, systems and methods provide enhanced UWA communications.

Additional advantageous features, functions and applications of the disclosed systems and methods of the present disclosure will be apparent from the description which follows, particularly when read in conjunction with the appended figures.

BRIEF DESCRIPTION OF THE DRAWINGS

To assist those of ordinary skill in the art in making and using the disclosed apparatus, systems and methods, reference is made to the appended figures, wherein.

DESCRIPTION OF EXEMPLARY EMBODIMENT(S)

Figure 1:
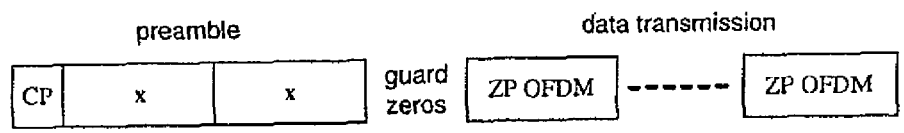
FIG. 1 depicts the general structure of a transmission that includes a cyclic prefix, two identical OFDM symbols preceding a data transmission that uses zero padded OFDM.

According to the present disclosure, advantageous apparatus, systems and methods are provided for facilitating enhanced underwater acoustic (UWA) communications. More particularly, the disclosed apparatus, systems and methods generally involve detection, synchronization, and Doppler scale estimation for an online and/or real-time underwater acoustic receiver. In exemplary embodiments, the present disclosure employs a transmitter that uses OFDM waveforms for data transmission. As shown in FIG. 1, the overall transmission structure is broken down into a preamble followed by the data transmission. For synchronization purposes, the preamble includes two identical OFDM symbols with a cyclic prefix. Data transmission is accomplished using a transmitter that transmits zero-padded (ZP) OFDM to avoid power consumption on the guard intervals. Of note, the OFDM parameters can be selected independently for the preamble and data transmission portions. OFDM divides the available bandwidth into a large number of overlapping subbands, such that the symbol duration is long compared to the multipath spread of the channel.

Figure 2:
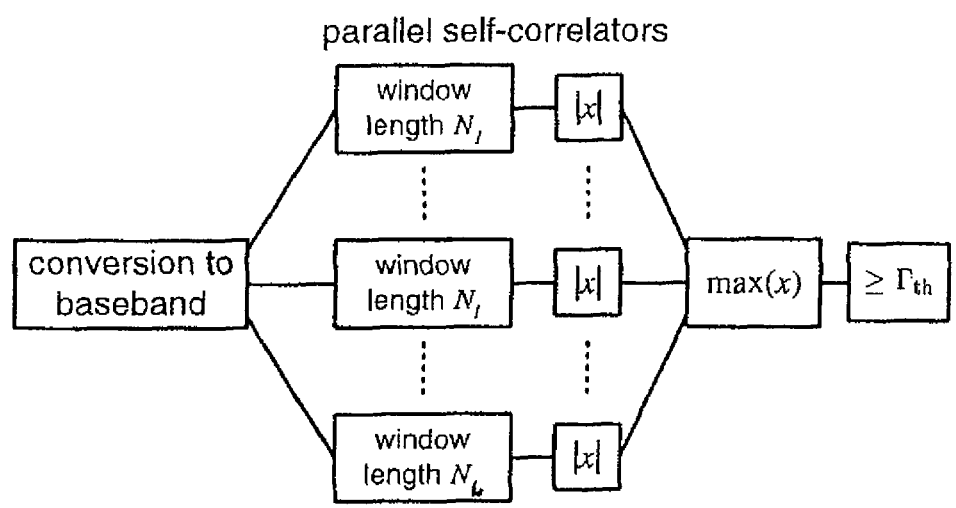
FIG. 2 depicts a diagram of an exemplary bank of self-correlators for producing correlation metrics.

In exemplary embodiments, the disclosed apparatus, systems and methods employ a receiver that includes a bank of parallel branches, with each branch having a self-correlator matched to a different waveform scaling factor (i.e., periodicy), as shown in FIG. 2. In this way, the receiver is able to compensate for the time compression/dilation in UWA communication transmissions. The disclosed receiver can operate on discrete samples and a detection is declared when any of the branches leads to a correlation metric larger than a predefined threshold. The branch with the largest correlation metric is viewed as yielding a Doppler scale estimate and a coarse synchronization point. Stated differently, the branch with the largest correlation metric is taken as having the best match on the repetition period.

Synchronization can then be performed on the branch that yields the maximum correlation metric. After the maximum correlation metric is determined, the start of transmission receipt is selected. Starting from the peak, the about 80% "shoulders" are determined and the middle is chosen as the synchronization point. This process is beneficial because the maximum correlation metric has a plateau around the peak due to the CP structure. This substantially completes the general procedure of the proposed detection, synchronization, and Doppler scale estimation.

The necessary Doppler scale spacing in the parallel self-correlator structure for detection purposes is then determined by analyzing the false alarm and detection probabilities of a single branch, as a function of the threshold and the Doppler scale. Finding the probability of false alarm can then be linked to a Grassmannian line packing problem, which is previously determined.

Performance degradation on data transmission due to Doppler scale mismatch can then be analyzed. As previously discussed, ZP-OFDM is used for data transmission, and its parameters can be chosen independently of the preamble. A two-step approach to mitigating the channel Doppler effect can be accomplished. The first step is to resample in the passband with a resampling factor. The second step is to perform fine Doppler shift compensation to obtain the estimated Doppler shift.

For implementation and performance testing, the appropriate maximum speed mismatch (e.g., the greatest mismatch speed that does not considerably degrade the detection performance and is suggested by signal-to-noise ratio analysis) may indicate that a multi-grid approach for the implementation stage is most appropriate. This multi-grid approach includes a coarse-grid search for detection and a fine-grid search for data demodulation. However, in alternative embodiments, instead of a multi-grid search, an interpolation based approach to improve the estimation accuracy beyond the limit set by the step size may also be used.

In sum, the present disclosure provides detection, synchronization, and Doppler scale estimation for underwater acoustic communication based on multicarrier waveforms. The performance of the proposed Doppler scale estimation is comparable to previous estimations based on the LFM preamble and postamble. One key advantage of the proposed method is that it avoids the need to buffer the whole packet before data demodulation and hence is capable of online and/or real-time receivers for multicarrier underwater acoustic communication.

1. The System, Method and Apparatus

In exemplary embodiments, zero-padded OFDM (ZP-OFDM) is used instead of conventional cyclic prefix OFDM in order to save transmission power on the long guard interval, as described above. In reference to FIG. 1, for synchronization purposes, the preamble consists of two identical OFDM symbols with a cyclic prefix. The data transmission (the ZP-OFDM) is then transmitted after the preamble. The OFDM parameters can be selected independently for the preamble and data portions.

If $K_0$ subcarriers have been used in the preamble and one OFDM symbol is of duration $T_0$, the subcarrier spacing is $1/T_0$ and the bandwidth is $B=K_0/T_0$. Also, if $f_c$ denotes the carrier frequency, and $f_k=f_c+k/T_0$ denotes the frequency for the kth subcarrier in passband, $k \in S=\{-K_0/2, \ldots, K_0/2-1\}$. Further, if $T_{cp}$ denotes the CP length, and defines a rectangular window of length $T_{cp}+2T_0$, then $$q(t) = \begin{cases} 1 & t \in [-T_{cp}, 2T_0], \\ 0 & \text{otherwise.} \end{cases} \quad (1)$$

Therefore, in baseband, the preamble can be written as $$x(t) = \sum_{k \in S} s[k] e^{j2\pi \frac{k}{T_0} t} q(t), \quad (2a)$$

and the corresponding passband signal is $$\tilde{x}(t) = \text{Re}\left\{ e^{j2\pi f_c t} \sum_{k \in S} s[k] e^{j2\pi \frac{k}{T_0} t} q(t) \right\} \quad (2b)$$

$$= \text{Re}\left\{ \sum_{k \in S} s[k] e^{j2\pi f_k t} q(t) \right\},$$

where s[k] is the transmitted symbol on the kth subcarrier.

The channel impulse response for a time-varying multipath underwater acoustic channel can be described by $$c(\tau, t) = \sum_p A_p(t) \delta(\tau - \tau_p(t)), \quad (3)$$

where $A_p(t)$ is the path amplitude and $\tau_p(t)$ is the time-varying path delay.

In exemplary embodiments, in order to develop algorithms for the systems, methods and apparatus provided herein, at least two main assumptions are made. Hence, the application of the exemplary systems, methods and apparatus derived from these assumptions may be limited to underwater environments where the assumptions, at least in part, hold true. However, it is contemplated that other systems, methods and apparatus according to the present disclosure may be suited to similar or dissimilar underwater environments.

Assumption A1—All Paths have a Similar Doppler Scaling Factor "a" Such That:

$$\tau_p(t) \approx \tau_p - at. \quad (4)$$

In general, different paths of the exemplary receivers provided herein could have different Doppler scaling factors. Some exemplary systems, methods and apparatus are based on the assumption that all the paths have approximately the same Doppler scaling factor. When this assumption does not hold true, part of the useful signal may treated as additive noise—which increases the overall noise variance. It is noted that the experimental results presented below show that as long as the dominant Doppler shift is caused by the direct transmitter/receiver motion, the assumption is justified. In fact, the value of a has been shown to be less than 0.01 when the relative speed between the transmitter and the receiver is below 10 m/s.

Assumption A2—The Path Delays $\tau_p$, the Gains $A_p$ and the Doppler Scaling Factor a are Constant Over the Preamble Duration $2T_0=T_{cp}$:

In one embodiment, the preamble duration is around 50 ms to 200 ms. In such an embodiment, Assumption A2 is reasonable as the channel coherence time is usually on the order of seconds.

When the passband signal $\tilde{x}(t)$ goes through the channel described in the expressions enumerated as (3) and (4) above, $\tilde{y}(t)$ can be expressed as:

$$\tilde{y}(t) = \text{Re}\left\{ \sum_{k \in S} s[k] e^{j2\pi f_k (1+a)t} \times \sum_p A_p q((1+a)t - \tau_p) e^{-j2\pi f_k \tau_p} \right\} + \tilde{n}(t), \quad (5)$$

where $\tilde{n}(t)$ is the additive noise. If $T_{max}$ is defined as $\tau_{max}=\max_p \tau_p$, which is usually less than the CP length $T_{cp}$, the definition of q(t) in the expression enumerated as (1) above can be used to obtain:

$$\tilde{y}(t) = \text{Re}\left\{ \sum_{k \in S} H_k s[k] e^{j2\pi f_k (1+a)t} \right\} + \tilde{n}(t), \quad (6)$$

$$t \in \mathcal{T}_{cyclic} = \left[ -\frac{T_{cp} - \tau_{max}}{1+a}, \frac{2T_0}{1+a} \right],$$

where $H_k$ is the channel frequency response at the kth subcarrier:

$$H_k = C(f_k), \quad (7)$$

$$C(f) = \sum_p A_p e^{-j2\pi f \tau_p}. \quad (8)$$

If the passband signal $\tilde{y}(t)$ is converted to baseband version $y(t)$ such that $\tilde{y}(t)=\text{Re}\{y(t)e^{j2\pi f_c t}\}$, $y(t)$ can be written as $$y(t) = \sum_{k \in S} H_k s[k] e^{j2\pi \left(\frac{k}{T_0} + \alpha f_k\right)t} + n(t), \quad t \in \mathcal{T}_{cyclic}, \quad (9)$$

where n(t) is the noise at baseband.

In an exemplary embodiment utilizing CP-OFDM, a cyclic convolution between the signal and the channel in the specified interval has been observed, where each subcarrier is only multiplied by the corresponding frequency response. Due to the wideband nature of the underwater channel, the frequency of each subcarrier at baseband may have been shifted differently by an amount expressed as $af_k=af_c+ak/T_0$.

2. The Proposed Approach

In a currently preferred embodiment the disclosed apparatus, systems and methods employ a transmitter that sends a baseband waveform embedding a repetition pattern as $$x(t)=x(t+T_0), -T_{cp} \leq t \leq T_0. \quad (10)$$

Such a repetition pattern persists in the received signal y(t) even after time-varying multipath propagation as $$y(t) = e^{-j2\pi \frac{a}{1+a} f_c T_0} y\left(t + \frac{T_0}{1+a}\right), \quad (11)$$

$$-\frac{T_{cp} - \tau_{max}}{1+a} \leq t \leq \frac{T_0}{1+a}.$$

However, in the embodiments the receiver knows neither the period nor the waveform due to the unknown multipath channel and thus is advantageous to detect a pattern from the incoming signal and infer the repetition period to find the Doppler scale. Although the problem of estimating an unknown delay (synchronization) and Doppler scale has been studied, typical approaches assume a non-dispersive channel and are therefore based on matched filter processing and the ambiguity function. See, e.g., L. Weiss, "Wavelets and wideband correlation processing," *IEEE Signal Processing Mag.*, vol. 11, no. 1, pp. 13-32, January 1994; G. Giunta, "Fast estimators of time delay and Doppler stretch based on discrete-time methods," *IEEE Trans. Signal Processing*, vol. 46, no. 7, pp. 1785-1797, July 1998; and X. X. Niu, P. C. Ching, and Y. T. Chan, "Wavelet based approach for joint time delay and Doppler stretch measurements," *IEEE Trans Aerosp. Electron. Syst.*, vol. 35, no. 3, pp. 1111-1119, July 1997. In fact, at least one prior approach treated random echo, but suggested estimating the unknown channel transfer function jointly with delay and Doppler scale and therefore leading to high-complexity receiver processing—which is not suited for continuous data monitoring and detection. See, e.g., L. H. Sibul and L. G. Weiss, "A wideband wavelet based estimator correlator and its properties," *Multidimensional Systems and Signal Processing*, vol. 13, no. 2, pp. 157-186, April 2002.

In direct contrast and in reference to FIG. 2, the disclosed apparatus, systems and methods of the present disclosure employ a receiver that includes a bank of parallel branches, with each branch having a self-correlator matched to a different waveform scaling factor (i.e., periodicy). Detection, synchronization, and Doppler scale estimation of the received signal are all accomplished based on the correlation metrics provided by the bank of self-correlators. The receiver may operate on discrete samples and the baseband signal y(t) may be oversampled at a multiple of the system bandwidth with the sampling interval $t_s=1/(\lambda B)$, where $$y[n]=y(t)|_{t=nt_s}, \quad (12)$$

and the oversampling factor $\lambda$ is an integer.

An exemplary embodiment of an algorithm for detection, synchronization, and Doppler scale estimation by the bank of parallel branches of the receiver includes four steps.

In one embodiment, the first step includes calculating a correlation metric of each of the L branches with one window candidate size $N_l$, for each dealy d, where $$M(N_l, d) = \frac{\sum_{i=d}^{d+N_l-1} y*[i]y[i+N_l]}{\sqrt{\sum_{i=d}^{d+N_l-1} |y[i]|^2 \cdot \sum_{i=d}^{d+N_l-1} |y[i+N_l]|^2}}, \quad (13)$$

for l=1, . . . L. The window size $N_l$ should be close to $\lambda K_0$, which is the number of samples of one OFDM symbol when no Doppler scaling occurs.

In general, the second step includes detection of the signal. A detection may be declared of the correlation metric of any branch exceeding a pre-defined value or preset threshold $\Gamma_{th}$:

$$H_1 \text{ if: } \max_l |M(N_l, d)| \geq \Gamma_{th} \quad (14)$$

Since the norm of the metric of the exemplary embodiment described above in the equation as (11) above was 0 and 1, the threshold $\Gamma_{th}$ may take a value from [0,1].

In one embodiment, the third step includes obtaining the correlation metric with the optimum match on the repetition period. In a preferred embodiment, the branch with the largest correlation metric is viewed as having the optimum match on the repetition period. Since Doppler scaling changes the period $T_0$ to $T_0/(1+a)$, the Doppler scale factor may be estimated as $$\hat{a} = \frac{\lambda K_0}{\hat{N}} - 1, \text{ where } \hat{N} = \arg \max_{\{N_l\}} |M(N_l, d)|. \quad (15)$$

The relative speed between the transmitter and the receiver can then be estimated as $$\hat{v} = c\hat{a}, \quad (16a)$$

where c is the speed of sound in water. Additional processing can be used to refine the Doppler scale estimate, as will be shown later in Section 4.

In general, the fourth step includes performing synchronization on the branch that yields the maximum correlation metric, i.e., the optimum match on the repetition period. After the maximum correlation metric is determined, the start of a transmission can be selected. See, e.g., T. M. Schmidl and D. C. Cox, "Robust frequency and timing synchronization for OFDM," *IEEE Trans. Commun.*, vol. 45, no. 12, pp. 1613-1621, December 1997. This may be accomplished by starting from the peak and locating the 80% "shoulders" (e.g., first sample of this correlator branch before and after the peak that is less than about 80% of the peak). Then, the middle can be chosen as the synchronization point. This process of locating the synchronization point may be beneficial because, due to the CP structure, the correlation metric has a plateau around the peak.

As described above, in an exemplary embodiment the four steps may complete the general procedure of the proposed detection, synchronization, and Doppler scale estimation algorithm of the apparatus, systems and methods. However, some additional parameters may be addressed by analyzing the detection performance (described below in Section 4) and the data demodulation performance under Doppler scale mismatch (also described below in Section 4). These parameters include, inter alia, the detection threshold, the number of parallel branches and the Doppler scale resolution.

Of note, in regards to Doppler scale resolution, since the window size $N_1$ is an integer, the minimum step size on the Doppler scale is generally $1/(\lambda K0)$. To improve the Doppler scale resolution, an exemplary receiver may operate on the oversampled baseband signal. The oversampling factor typically depends on the needed Doppler scale resolution and the parameter $K_0$. The maximum value of $\lambda$ is the ratio of the passband sampling rate to the baseband signal bandwidth, which is typically less than 50 in underwater applications.

Also of note, in regards to implementation complexity, the three sliding summations enumerated above as (13) can be computed recursively. For example, one can assume $$\psi(N_l, d) = \sum_{i=d}^{d+N_l-1} y*[l]y[i+N_l].$$

Further, instead of summing over $N_1$ multiplications, one can use $$\psi(N_l,d+1)=\psi(N_l,d)+y*[d+N_l]y[d+2N_l]-y*[d]y[d+N_l], \quad (16b)$$

which amounts to two complex multiplications and two complex additions for each update. Hence, for each delay d, the metric $M(N_l, d)$ in the expression enumerated as (13) above can be computed by no more than seven complex multiplications, six complex additions, one square root operation, and one division. It is also noted that the complexity does not depend on the window size. In fact, such a low complexity approach has been implemented in a DSP board for one self-correlator branch. See, e.g., H. Yan, S. Zhou, Z. Shi, and B. Li, "A DSP implementation of OFDM acoustic modem," in *Proc. of the ACM International Workshop on Under Water Networks (WUWNet)*, Montreal, Quebec, Canada, September 2007.

It is further noted that, in regards to fine-timing, with the estimated Doppler scale â, an exemplary receiver can resample the preamble. In this way, the "wideband" channel effect of frequency-dependent Doppler shifts can be reduced to the "narrowband" channel effect of frequency-independent Doppler shifts. Fine-timing algorithms developed for narrowband radio channels can then be applied on the resampled preamble. In this way, the "first" path can be synchronized, instead of the "strongest" path in the traditional case of the LFM based method. Due to channel fading, the strongest path may appear at random positions within the delay spread, which is undesirable for the task of data block partitioning after the synchronization. In contrast, the position of the first path is more stable.

3. The Receiver Operating Characteristics

The output of each exemplary correlator may be a random variable due to the additive noise. The probabilities of false alarm $P_{fa}$ and detection $P_d$ are the probabilities of the correlator output exceeding a threshold $\Gamma_{th}$ under the "no signal" and "signal" hypotheses, respectively. The false alarm and detection probabilities of a single branch of the exemplary receiver, as a function of the threshold $\Gamma_{th}$ and the Doppler scale a, may be analyzed to determine desirable parameters of the receiver of the disclosed exemplary apparatus, systems and methods. For detection purposes, this type of analysis may yield the necessary or appropriate Doppler scale spacing in the parallel self-correlator structure. Due to over-sampling, the summations in the metric given in the equation enumerated as (11) above of the lth branch can be approximated with continuous time integrals, such as $$M(\hat{T}, t) = \frac{\int_t^{t+\hat{T}} y(\tau)*y(\tau+\hat{T})d\tau}{\sqrt{\int_t^{t+\hat{T}} |y(\tau)|^2 d\tau \cdot \int_t^{t+\hat{T}} |y(\tau+\hat{T})|^2 d\tau}}, \quad (17)$$

where $$\hat{T} = N_l \cdot t_s = \frac{T_0}{1+\hat{a}}, \quad t = d \cdot t_s. \quad (18)$$

The Probability of False Alarm

In theory, when no signal is present, $y(t)=n(t)$. Since $B\hat{T} \approx K_0$, a set of orthonormal basis functions $\{f_i(t)\}_{i=0}^{K_0-1}$ may be found, such that $$n(\tau) = \sum_{i=0}^{K_0-1} n_{t,i} f_i(\tau), \quad \tau \in [t, t+\hat{T}] \quad (19)$$

$$n(\tau+\hat{T}) = \sum_{i=0}^{K_0-1} n_{t+\hat{T},i} f_i(\tau), \quad \tau \in [t, t+\hat{T}] \quad (20)$$

It may be assumed that n(t) is a Gaussian noise process, and then $n_{t,i}$ and $n_{t+\hat{T},i}$ are independent and identically distributed Gaussian random variables. Further, one may define $\mathbf{n}_t=[n_{t,0},\ldots,n_{t,K_0-1}]^T$ and $\mathbf{n}_{t+\hat{T}}=[n_{t+\hat{T},0},\ldots,n_{t+\hat{T},K_0-1}]^T$, and their normalized versions as $\tilde{\mathbf{n}}_t=\mathbf{n}_t/\|\mathbf{n}_t\|$ and $\tilde{\mathbf{n}}_{t+\hat{T}}/\|\mathbf{n}_{t+\hat{T}}\|$. The correlator output may then be simplified to the inner product between two unit-length vectors as $$M(\hat{T}, t) = \tilde{\mathbf{n}}_t^{\mathcal{H}} \tilde{\mathbf{n}}_{t+\hat{T}}. \quad (21)$$

In an exemplary embodiment, the probability of false alarm is then linked to a Grassmannian line packing problem. See, e.g., J. H. Conway, R. H. Hardin, and N. J. A. Sloane, "Packing lines, planes, etc.: Packings in Grassmannian space," *Experimental Math.*, vol. 5, no. 2, pp. 139-159, 1996. Specifically, $\tilde{\mathbf{n}}_t$ can be viewed as coordinates of a point on the surface of a hypersphere with unit radius, centered around the origin. This point dictates a straight line in a complex space $\mathbb{C}^{K_0}$ that passes through the origin. The two lines generated by $\tilde{\mathbf{n}}_t$ and $\tilde{\mathbf{n}}_{t+\hat{T}}$ have a distance defined as:

$$d(\tilde{\mathbf{n}}_t, \tilde{\mathbf{n}}_{t+\hat{T}}) := \sin(\theta_t) = \sqrt{1 - |\tilde{\mathbf{n}}_t^{\mathcal{H}} \tilde{\mathbf{n}}_{t+\hat{T}}|^2}, \quad (22)$$

where θt denotes the angle between these two lines. The distance $d(\tilde{\mathbf{n}}_t, \tilde{\mathbf{n}}_{t+\hat{T}})$ is known as "chordal distance." See, e.g., J. H. Conway, R. H. Hardin, and N. J. A. Sloane, "Packing lines, planes, etc.: Packings in Grassmannian space," *Experimental Math.*, vol. 5, no. 2, pp. 139-159, 1996. Since n(t) is additive white and Gaussian, $\tilde{\mathbf{n}}_t$ and $\tilde{\mathbf{n}}_{t+\hat{T}}$ are uniformly distributed on the surface of the hypersphere. Without loss of generality, to evaluate the distribution of the chordal distance it can be assumed that $\tilde{\mathbf{n}}_{t+\hat{T}}$ is fixed a priori and $\tilde{\mathbf{n}}_t$ is uniformly distributed. Thus, it can be inferred that $$Pr\{d^2(\tilde{\mathbf{n}}_t,\tilde{\mathbf{n}}_{t+\hat{T}}) < z\} = z^{K_0-1}, \quad 0<z<1. \quad (23)$$

Therefore, the probability of false alarm is:

$$P_{fa}=Pr(M(\hat{T},t)>\Gamma_{th})=(1-\Gamma_{th}^2)^{K_0-1}. \quad (24)$$

Of note, $P_{fa}$ does not depend on the power of the additive noise and therefore the threshold $\Gamma_{th}$ can be preset to achieve a constant false alarm rate independent of the noise level.

The Probability of Detection

To determine the probability of detection, it can be assumed that the signal is present, and the expression enumerated as (9a) above as $$y(t)=x_c(t)+n(t), \quad (25)$$

where the signal is $$x_c(t) = e^{j2\pi a f_c t} \sum_{k \in S} H_k s[k] e^{j2\pi \frac{k}{T_0}(1+a)t}, \quad t \in \mathcal{T}_{cyclic}. \quad (26)$$

Treating the signal as deterministic unknown, the autocorrelation function of $x_c(t)$ can be defined as $$\phi_{xx}(T, \Delta T) = \frac{1}{T} \int_t^{t+T} x_c(\tau) x_c(\tau + \Delta T) d\tau. \quad (27)$$

The noise may be viewed as wide sense stationary, and its autocorrelation function may be defined as $\phi_{nn}(\tau)$. Assuming that the integration is done in a proper window where $x_c(t)$ is well defined (as in the expression enumerated as (26) above), we can obtain:

$$E\left\{\int_t^{t+\hat{T}} y(\tau)^* y(\tau + \hat{T}) d\tau\right\} = \hat{T}\phi_{xx}(\hat{T}, \hat{T}), \quad (28)$$

$$t \in \mathcal{T}_{plateau} := \left[-\frac{T_{cp} - \tau_{max}}{1+a}, \frac{T_0(1+2\hat{a}-a)}{(1+a)(1+\hat{a})}\right]$$

$$E\left\{\int_t^{t+\hat{T}} |y(\tau)|^2 d\tau\right\} = \quad (29)$$

$$E\left\{\int_t^{t+\hat{T}} |y(\tau + \hat{T})|^2 d\tau\right\} = \hat{T}[\phi_{xx}(\hat{T}, 0) + \phi_{nn}(0)], \quad t \in \mathcal{T}_{plateau}.$$

As disclosed in T. M Schmidl and D. C. Cox, "Robust frequency and timing synchronization for OFDM," *IEEE Trans. Commun.*, vol. 45, no. 12, pp. 1613-1621, December 1997, the absolute value of the correlation metric in the presence of the signal has can be approximated as a Gaussian random variable to derive some approximate results. Following the same principle, an approximation of the mean of the correlator output can be expressed:

$$E\{|M(\hat{T}, t)|\} \approx \frac{\hat{T}|\phi_{xx}(\hat{T}, \hat{T})|}{\hat{T}\phi_{xx}(\hat{T}, 0) + \hat{T}\phi_{nn}(0)} \quad (30)$$

$$= \frac{\alpha\gamma}{\gamma+1}, \quad t \in \mathcal{T}_{plateau},$$

where $\gamma = \phi\text{hd } xx(\hat{T},0) + \phi_{nn}(0)$ is the signal-to-noise-ratio (SNR) at the receiver, and $\alpha$ is correlation coefficient $$\alpha = \frac{|\phi_{xx}(\hat{T}, \hat{T})|}{\phi_{xx}(\hat{T}, 0)}. \quad (31)$$

The variance is approximately $$\text{Var}\{|M(\hat{T}, t)|\} \approx \frac{2\gamma^3 + 5\gamma^2 + 3\gamma + 1}{2K_0(\gamma+1)^4}, \quad t \in \mathcal{T}_{plateau}. \quad (32)$$

In the radio channel case $|\alpha|=1$, the variation may only be due to the additive noise. It is proposed that the variance can still be used in the case of Doppler scaling since the variation of the correlation output is mainly due to additive noise.

Further, the correlation coefficient $\alpha$ can be specified. Based on the expression enumerated as (26) above, we have for $t \in T_{plateau}$ $$\phi_{xx}(\hat{T}, \hat{T}) = \frac{1}{\hat{T}} \int_t^{t+\hat{T}} [x_c^*(\tau) x_c(\tau + \hat{T})] d\tau = \quad (33a)$$

$$e^{-j2\pi a f_c \hat{T}} \sum_{k \in S} \sum_{l \in S} H_k s[k] H_l^* s^*[l] \times \frac{1}{\hat{T}} \int_t^{t+\hat{T}} e^{j2\pi(1+a)\left[\frac{k}{T_0}\tau - \frac{l}{T_0}(\tau+\hat{T})\right]} d\tau, \quad (33b)$$

which lead to $$|\phi_{xx}(\hat{T}, \hat{T})| = \quad (34)$$

$$\left|\sum_{k \in S} \sum_{l \in S} H_k s[k] H_l^* s^*[l] e^{-j2\pi(1+\epsilon)l} \times e^{j\pi(1+\epsilon)(k-l)} \text{sinc}[(1+\epsilon)(k-l)]\right|,$$

where $\sin c(x) = \sin(\pi x)/(\pi x)$ and $(1+\epsilon) = (1+a)/(1+\hat{a})$ with $\hat{a} = T_0/\hat{T} - 1$ from the expression enumerated as (18) above. Therefore, $\epsilon \approx a - \hat{a}$. It may also be assumed that $\epsilon$ is tiny, and thus we can approximate $\sin c[(1+\epsilon)(k-l)] \approx \delta[k-l]$. Therefore, for constant amplitude modulation $|s[i]|^2 = \sigma_s^2$, we have $$|\phi_{xx}(\hat{T}, \hat{T})| \approx \sigma_s^2 \left|\sum_{k \in S} |H_k|^2 e^{-j2\pi k(a-\hat{a})}\right|. \quad (35)$$

Similar approximation may be done for $\phi_{xx}(\hat{T}, 0)$, which yields $$\alpha \approx \frac{\left|\sum_{k \in S} |H_k|^2 e^{-j2\pi k(a-\hat{a})}\right|}{\sum_{k \in S} |H_k|^2}, \quad (36)$$

In summary, with a approximated in the expression enumerated as (36) above, the mean $\mu_a$ approximated in the expression enumerated as (30) above, and the variance $\sigma_a$ approximated in the expression enumerated as (32) above, an approximate expression for the probability of detection in $T_{plateau}$ is $$P_d = Pr\{|M(\hat{T}, t)| \geq \Gamma_{th}\} \approx Q\left(\frac{\Gamma_{th} - \mu_a}{\sigma_a}\right), \quad (37)$$

$$\text{where } Q(x) = \left(1/\sqrt{2\pi}\right) \int_x^\infty e^{-t^2/2} dt.$$

Numerical Validation

In an exemplary embodiment, to assess the effect of Doppler scale mismatch on the detection performance, a simulation using the following steps can be completed and the results analyzed:

1. Generate the baseband samples via the expressions enumerated as (9a) and sample it as in the expression enumerated as (12) above.
2. Compare the statistics of the correlator output at the signal start t=0 on the branch with $N_I = \lambda K_0$.

For a non-dispersive channel with a single path, the correlator as shown in the expression enumerated as (30) above can be simplified to $$E\{|M(\hat{T}, 0)|\} = \frac{\alpha\gamma}{\gamma+1} = |\text{sinc}[K(a-\hat{a})]| \frac{\gamma}{\gamma+1}. \quad (38)$$

Figure 8A:
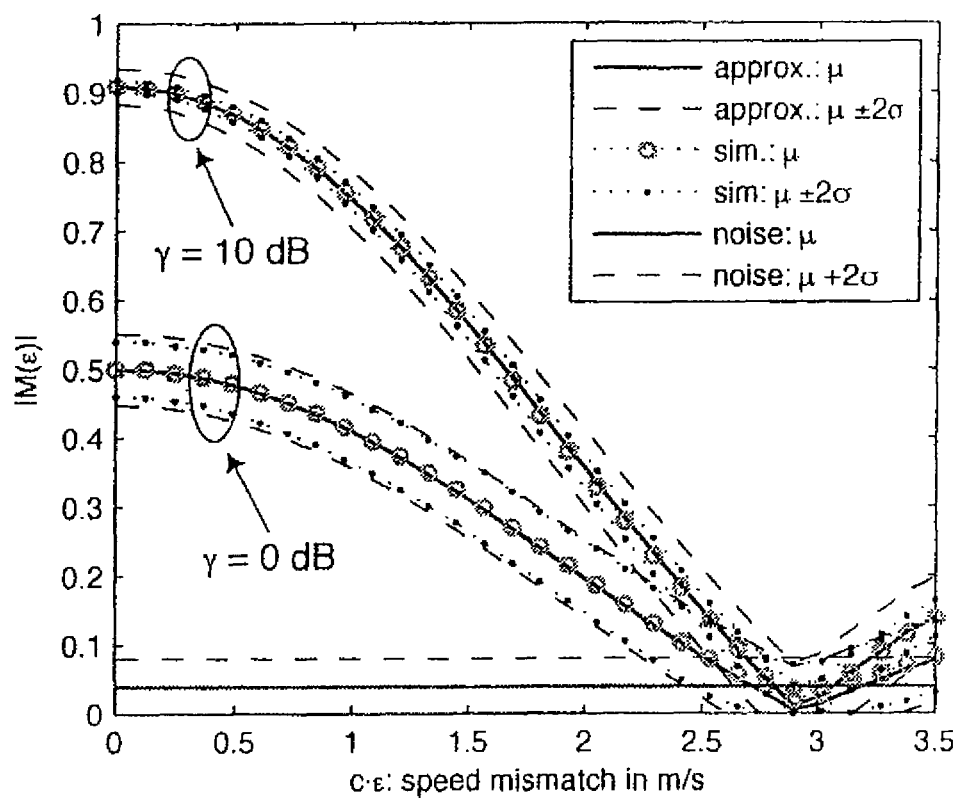
FIG. 8a depicts statistics of an exemplary correlator output for a non-dispersive channel with a single path.

The simulation results for the non-dispersive channel are shown in FIG. 8. It can be seen from FIG. 8a that the loss of correlation due to the unknown speed is modeled well by the sine function, while the approximation of the standard deviation is fairly exact for the low SNR case but only of the right magnitude for the high SNR case.

Figure 8B:
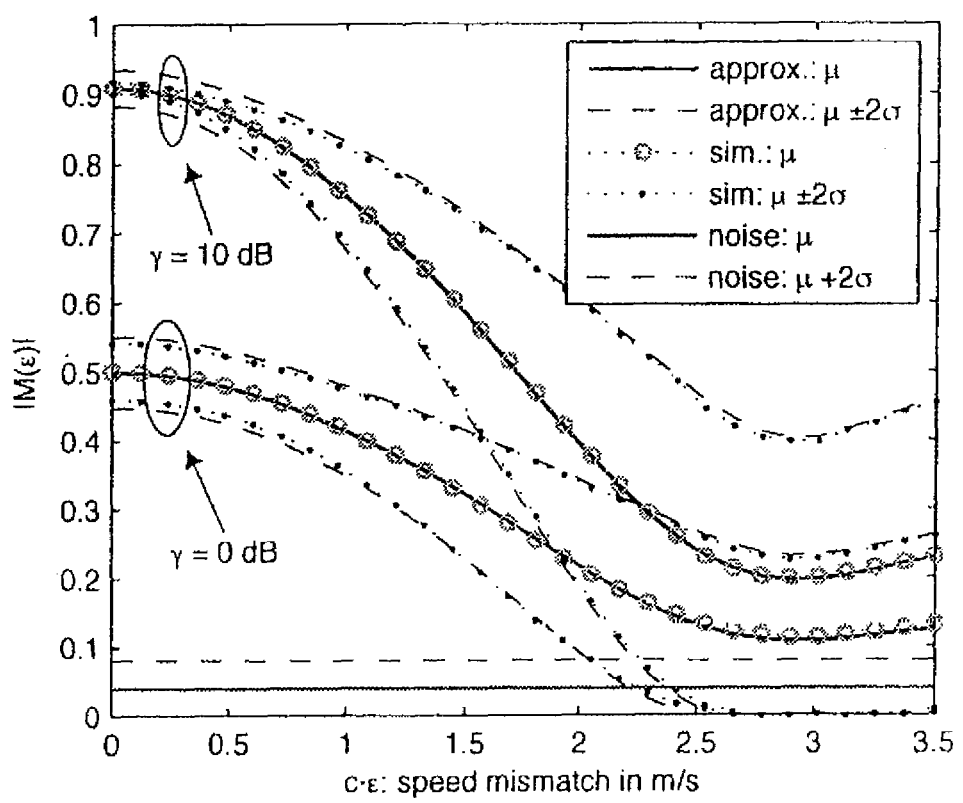
FIG. 8b depicts statistics of an exemplary correlator output for a dispersive channel with an exponential decay profile.

For dispersive channels, we averaged over different channel realizations and chose an exponentially decaying channel profile that loses about 20 dB within 10 ms. For each channel realization, the mean and variance of the Gaussian approximation were evaluated, then were averaged by approximating them via a single Gaussian distribution with matched moments. Because this is basically a Gaussian mixture distribution, the resulting mean can be said to be the average mean, while the variance is increased—it consists of the average variance and the additional "spread" of the means. The results of this setup are shown in FIG. 8b. FIG. 8b shows an identical behavior for $K(a-\hat{a}) \ll 1$ (inside the main lobe of the sine function). This phenomenon may be because for $\epsilon \approx a-\hat{a}=0$, $\alpha$ is fixed as unity (see the expression enumerated as (36) above), while for $\epsilon \neq 0$, $\alpha$ is a random variable depending on the specific channel realization. Accordingly, the additional variation in $\alpha$ may lead to an increased variance for larger $\epsilon$ and the sine shape is distorted depending on the channel statistics. However, as shown in FIG. 8b, for a small speed mismatch the behavior can be well approximated by the non-dispersive channel.

Figure 3:
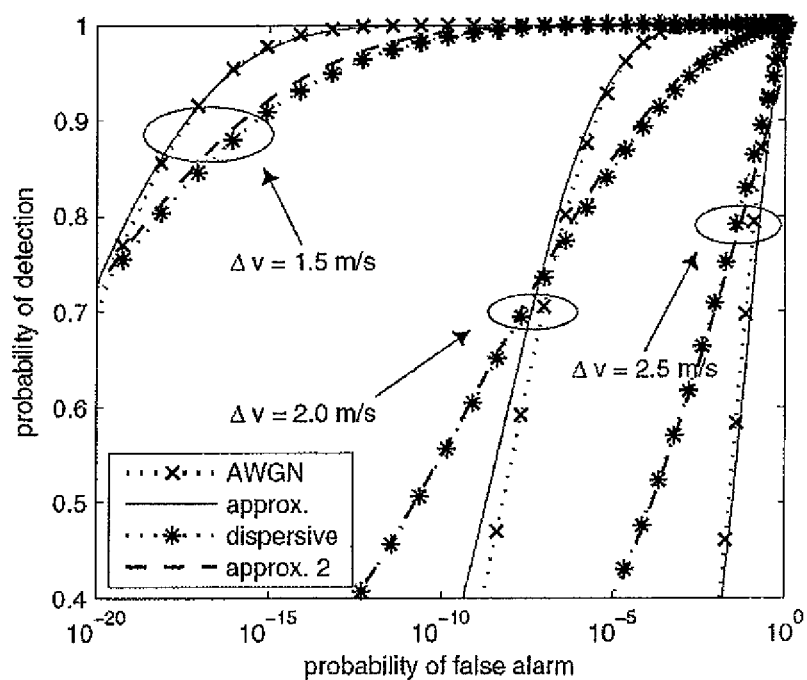
FIG. 3 depicts results from a simulation to assess the effect of Doppler scale mismatch on the detection performance using AWGN and dispersive channels using the Gaussian approximation of the probability of detection and simulated probability of detection for different channels against the exact probability of false alarm.

To assess the effect of Doppler scale mismatch, i.e., unknown speed, on the detection performance, FIG. 3 shows a plot of the receiver operating characteristic (ROC). FIG. 3 shows the exact probability of false alarm (see the expression enumerated as (24) above) plotted against the Gaussian approximation as well as Monte-Carlo simulation results for both AWGN and dispersive channels. For the non-dispersive case, it can be seen that the simulation results match the Gaussian approximation reasonably for the chosen speeds and SNR. In fact, in comparison to FIGS. 8a and 8b, the detection performance is superb as long as the mean, $\mu_a$, of the correlator output under the signal hypothesis and the mean under the noise hypothesis are separated by more than six times the standard deviation, $\sigma_a$.

In case of the dispersive channel, it can be seen from FIG. 3 that the mean $\mu_a$ of the correlator was always higher for large Doppler scales, but at the cost of an increased variance. This phenomenon results in the ROC's having less steep slopes intersecting the curves for the AWGN channel—accordingly performing better for detection probabilities around one half, but worse towards one (that are the regions of interest). This detrimental effect is negligible when the Doppler scale mismatch is less than, e.g., $c(a-\hat{a}) \approx 1.5$ m/s, which are also the regions of generally good performance. Therefore, for a limited Doppler scale mismatch, the detection performance is not significantly changed by the dispersive nature of the channel.

Comparison to LFM Based Detection

As described above, the detection performance of the exemplary methods, systems and apparatus utilizing the approach disclosed herein is advantageous. To confirm the advantages of the approach, we can compare the detection performance of our approach with the detection performance based on an LFM preamble with matched filter processing at the receiver followed by a threshold test. Although in practice this threshold has to be estimated online, for this comparison we can assume the noise level to be known for the LFM based approach.

Figure 9A:
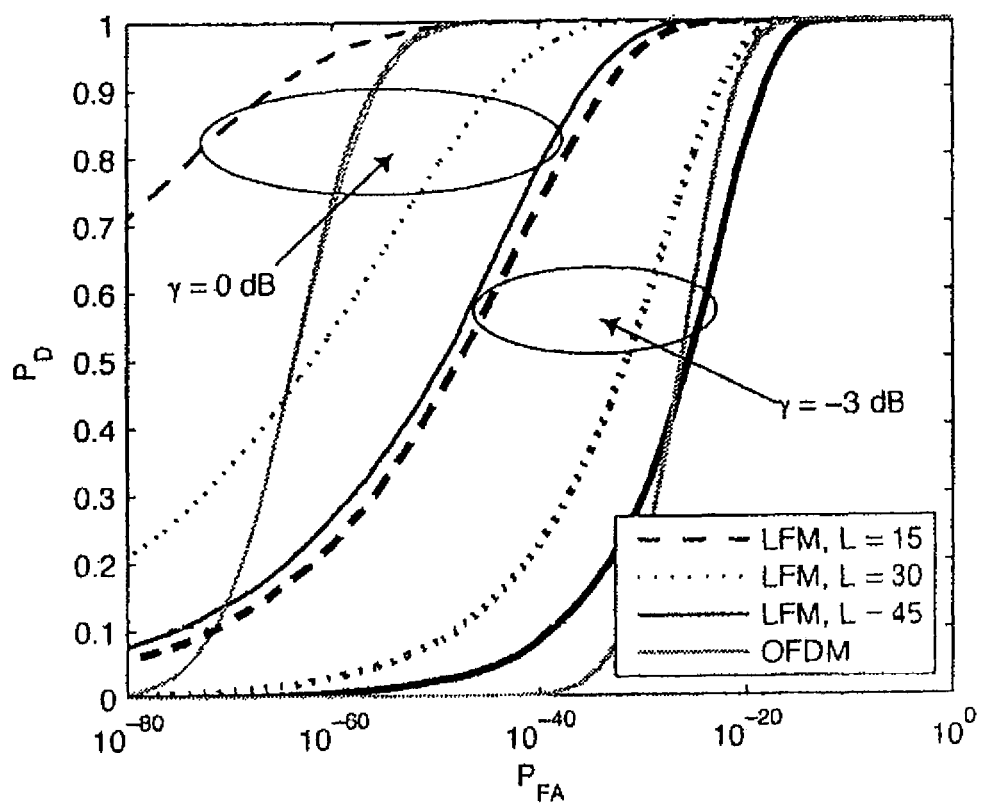
FIG. 9a depicts a comparison of receiver operating characteristics between an approach based on an LFM preamble/matched filter processing and an exemplary multi-carrier based approach.
Figure 9B:
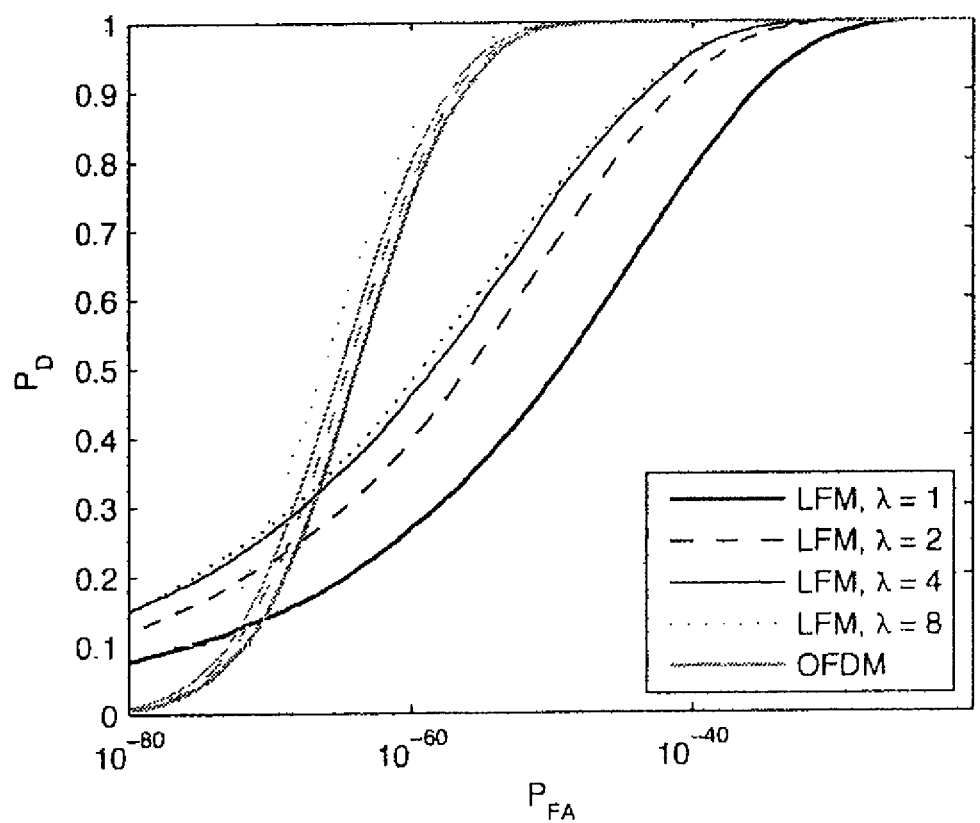
FIG. 9b depicts another comparison of receiver operating characteristics between an approach based on an LFM preamble/matched filter processing and an exemplary multi-carrier based approach.

For a comparison, a dispersive channel with L paths, with a uniform power profile and a total channel length of about 20 ms, can be used. Both approaches may use a bandwidth of 12 kHz and a preamble length of about 100 ms. The OFDM based approach can have $K_0 = 512$ subcarriers and therefore a detection SNR of approximately $K_0\gamma$, where $\gamma$ is the SNR per subcarrier. The LFM uses an upsweep with the same total energy, giving effectively a 3 dB advantage since the full preamble is used for correlation. FIGS. 9a and 9b show the ROCs for varying channel conditions and available oversampling for exemplary systems, methods or apparatus using these approaches. We note the following:

- As shown in FIG. 9a, the LFM based approach is less favorable when the number of paths increases, losing about 3 dB when the number of paths triples. Also shown in FIG. 9a, the ROC for $\gamma=-3$ dB, L=15 is almost identical with the ROC for $\gamma=0$ dB, L=45. This loss may be linked to a comparison between selection combining (SC) and maximum ratio combining (MRC), as the LFM based approach only utilizes the energy from the strongest path.
- As also shown in FIG. 9a, the multi-carrier approach degrades faster with SNR compared to the LFM based approach—since we use a "noisy" template for correlation. This effect may depend on the per carrier SNR $\gamma$. Thus, once $\gamma$ is larger than 0 dB, this effect may be negligible.
- As also shown in FIG. 9b, the LFM based approach degrades when no oversampling is used, as the width of the ambiguity function is small along the time axis.

We also note that for communication systems, both methods will work well in the practical SNR range, as data demodulation requires a decent SNR (much higher than the detection threshold). Further, the proposed apparatus, systems and methods of the present disclosure have a low-complexity implementation which is not available for the LFM based approach. Due to its non-parametric nature and low-cost implementation, the proposed approach of the present disclosure is an appealing choice for the preamble design in underwater multicarrier communication systems, apparatus and methods.

4. The Impact of Doppler Scale Estimation Accuracy

The performance degradation on data transmission due to Doppler scale mismatch can be analyzed for the proposed systems, methods or apparatus of the present disclosure, in order to specify the needed Doppler scale resolution from a data communication perspective.

For data transmission, ZP-OFDM, with parameters that are chosen independently of the preamble, can be used. If T denotes the OFDM symbol duration, $T_g$ the guard interval and K the number of subcarriers, then the subcarrier spacing is 1/T. The kth subcarrier can be said to be at a frequency $$f_k = f_c + k/T, k = -K/2, \ldots, K/2-1, \quad (39)$$

where $f_c$ is the carrier frequency so that the bandwidth is B=K/T. In theory, s[k] can be used to denote the information symbol to be transmitted on the kth subcarrier. Further, it can be assumed that the non-overlapping sets of active subcarriers $S_A$ and null subcarriers $S_N$ satisfy $S_A \cup S_N = \{-K/2, \ldots, K/2-1\}$ and thus the null subcarriers are used to facilitate Doppler compensation at the receiver. The transmitted signal in passband is then given by $$\tilde{x}(t) = \text{Re}\left\{\left[\sum_{k \in S_A} s[k] e^{j2\pi \frac{k}{T} t} g(t)\right] e^{j2\pi f_c t}\right\}, \quad t \in [0, T+T_g], \quad (40)$$

where g(t) describes the zero-padding operation, i.e., g(t)=1, $t \in [0, T]$ and g(t)=0 otherwise. Due to the adopted channel model, the received passband signal is $$\tilde{y}(t) = \text{Re}\left\{\sum_p \left[\sum_{k \in S_A} s[k] e^{j2\pi \frac{k}{T}(t+at-\tau_p)} g(t+at-\tau_p)\right] \times A_p e^{j2\pi f_c (t+at-\tau_p)}\right\} + \tilde{n}(t), \quad (41)$$

where ñ(t) is the additive noise.

In general, the proposed systems, methods and apparatus of the present disclosure utilize a two-step approach to mitigate the channel Doppler effect. In an exemplary embodiment, the first step is to resample $\bar{y}(t)$ in the passband with a resampling factor b, leading to $$\tilde{z}(t) = \tilde{y}\left(\frac{t}{1+b}\right). \quad (42)$$

The baseband version of $\tilde{z}(t)$ is $$z(t) = e^{j2\pi \frac{a-b}{1+b} f_c t} \sum_{k \in S} s[k] e^{j2\pi \frac{1+a}{1+b} \frac{k}{T} t} \times \left[\sum_p A_p e^{-j2\pi f_k \tau_p} g\left(\frac{1+a}{1+b} t - \tau_p\right)\right] + n(t). \quad (43)$$

In general, the second step is to perform fine Doppler shift compensation on z(t) to obtain $z(t)e^{-j2\pi\epsilon t}$, where $\epsilon$ is the estimated Doppler shift. Performing ZP-OFDM demodulation, the output $y_m$ on the mth subchannel is $$z_m = \frac{1}{T} \int_0^{T+T_g} z(t) e^{-j2\pi\epsilon t} e^{-j2\pi \frac{m}{T} t} dt. \quad (44)$$

Carrying out the integration yields:

$$z_m = C\left(\frac{1+b}{1+a}(f_m + \epsilon)\right) \sum_{k \in S} s[k] \varrho_{m,k} + v_m, \quad (45)$$

where $v_m$ is the additive noise, C(f) is as defined in the expression enumerated as (8) above, and $$\varrho_{m,k} = \frac{1+b}{1+a} \cdot \frac{\sin(\pi\beta_{m,k}T)}{\pi\beta_{m,k}T} e^{j\pi\beta_{m,k}T}, \quad (46)$$

$$\beta_{m,k} = (k-m)\frac{1}{T} + \frac{(a-b)f_m - (1+b)\epsilon}{1+a}. \quad (47)$$

Therefore, it follows that the effective SNR on the mth subcarrier can be expressed as $$\gamma_m = \frac{|\varrho_{m,m}|^2 \sigma_s^2}{\frac{\sigma_v^2}{\left|C\left(\frac{1+b}{1+a}(f_m+\epsilon)\right)\right|^2} + \sum_{k \neq m} |\varrho_{m,k}|^2 \sigma_s^2}, \quad (48)$$

where $\sigma_s^2 = E[|s[k]|^2]$ and $\sigma_v^2 = E[|v_m|^2]$. Ignoring the additive noise, the SNR is bounded by $$\gamma_m \leq \bar{\gamma}_m := \frac{|\varrho_{m,m}|^2}{\sum_{k \neq m} |\varrho_{m,k}|^2} \quad (49)$$

due to self-interference induced by Doppler scale mismatch.

Evaluation of the SNR Upperbound

In an exemplary embodiment, the SNR upperbound was evaluated for two cases:
1. Case 1: No Doppler shift compensation by setting $\epsilon$=0.
2. Case 2: Ideal Doppler shift compensation where:

$$\epsilon_{opt} = \frac{a-b}{1+b} f_c, \quad (50)$$

where:

$$\beta_{m,k} = (k-m)\frac{1}{T} + \frac{(a-b)m/T}{1+a}. \quad (51)$$

In a first case, the leading term (k−m)/T in $\beta_{m,k}$ is the frequency distance between the kth and the mth subcarriers, while the second term [(a−b)/(1+a)]$f_m$ is the extra frequency shift. For a second case, the leading term (k−m)/T in $\beta_{m,k}$ is the frequency distance between the kth and the mth subcarriers, while the second term[(a−b)/(1+a)]·m/T is the extra frequency shift. Since $f_m$ is much larger than m/T, it can be seen that Doppler shift compensation will improve the performance. In fact, considering an example of $f_c$=27 kHz and B/2=6 kHz, we have $f_m \in$ [21, 33] kHz and $\max_m$ m/T=6 kHz. Hence, the accuracy of (a−b) can be relaxed at least by four times to reach similar performance. Therefore, Doppler shift compensation is one important step in the receiver design of the proposed apparatus, systems and methods of the present disclosure.

Figure 4:
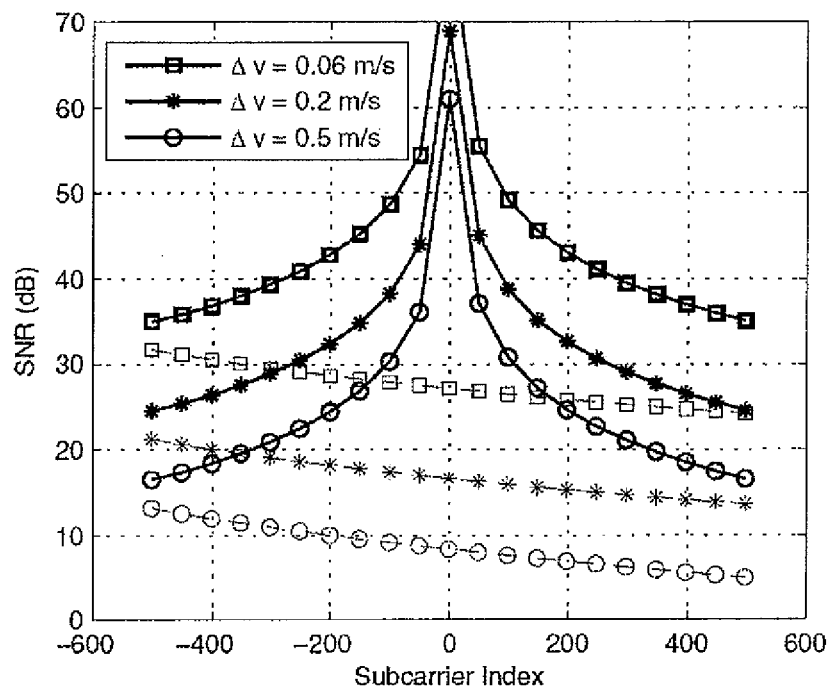
FIG. 4 depicts results (signal-to-noise ratio (SNR) vs. subcarrier index) from a simulation to provide guidelines on the selection of the Doppler scale spacing of parallel connectors ($\Delta v=0.5$ m/s, $\Delta v=0.2$ m/s, and $\Delta v=0.06$ m/s, respectively).

If fc=27 kHz, B=12 kHz, K=1024, T=85.3 ms, a numerical evaluation of the upperbounds $\bar{\gamma}_m$ for $\epsilon=0$ and $\epsilon=\epsilon_{opt}$ can be accomplished. FIG. 4 shows the bounds for these two cases respectively, where the speed mis-match after resampling is $\Delta v \approx (a-b) \cdot c$. More particularly, FIG. 4 shows the SNR upperbound $\bar{\gamma}_m$ for $\epsilon=\epsilon_{opt}$ (thick, full lines) and $\epsilon=0$ (thin, dashed lines) as a function of $\Delta v$, where $a-b=\Delta v/c$. As can be seen from FIG. 4, in order to limit the self-noise to at least 20 dB below the signal power, it is preferred that $\Delta v$ be less than 0.06 m/s for $\epsilon=0$, while $\Delta v$ can be as large as 0.2 m/s for $\epsilon=\epsilon_{opt}$. Hence, the fine Doppler compensation step proposed above in the two-step process improves the system performance substantially in the presence of Doppler scale mismatch.

It also follows that FIG. 4 provides guidelines on the selection of the Doppler scale spacing of the parallel correlators. For example, assuming that the correlator branch closest to the true speed will yield the maximum metric, then with fine Doppler shift compensation $\epsilon=\epsilon_{opt}$, the Doppler scale spacing can be set to be 0.4 m/s (where $\Delta v$ is preferably less than 0.2 m/s) to achieve an SNR upperbound of at least 25 dB. On the other hand, if an SNR upperbound of 15 dB is sufficient, the Doppler scale spacing could be as large as 1.0 m/s.

5. Implementation and Performance Testing

In reference to FIG. 3 and Section 3 above, it was determined that in an exemplary embodiment with a preamble $K_0=512$ and B=12 kHz, a speed mismatch of up to 1.5 m/s did not considerably degrade the detection performance. On the other hand, in reference to FIG. 4 and Section 4 above, it was indicated in SNR analysis for data reception with K=1024 and B=12 kHz that the speed mismatch should not exceed 0.3-0.5 m/s to limit ICI. In theory, this may suggest a multi-grid approach for implementation purposes. For example, one exemplary embodiment includes: (1) a coarse grid search for detection, and (2) a fine grid search for data demodulation. In one embodiment, a "coarse grid search" is defined as a search that utilizes only a few parallel self-correlators to monitor the incoming data. Such a "coarse grid search" may help to reduce the receiver complexity. In an exemplary embodiment, the fine grid search includes using a set of parallel self-correlators used only on the captured preamble after a detection is declared. The type of fine-grid search can be centered around the Doppler scale estimate from the coarse-grid search.

In another exemplary embodiment, instead of a multi-grid search, an interpolation based approach to improve the estimation accuracy beyond the limit set by the step size is used. This technique may be similar in form to one interpolation usually used in spectral peak location estimation based on a limited number of DFT samples (See, e.g., E. Jacobsen and P. Kootsookos, "Fast, accurate frequency estimators [DSP Tips & Tricks]," *IEEE Signal Processing Magazine*, vol. 24, no. 3, pp. 123-125, May 2007). Using this approach, after the coarse or fine-grid search, it is assumed |Xk| denotes the amplitude from the branch with the largest correlation output and |Xk−1| and |Xk+1| are the amplitudes from the left and right neighbors. With $\Delta a$ as the grid spacing, $$\delta = \frac{|X_{k+1}| - |X_{k-1}|}{4|X_k| - 2|X_{k-1}| - 2|X_{k+1}|} \Delta a \qquad (52)$$

can be used to estimate an offset $\delta$ of the Doppler scale deviating from the strongest branch towards the second strongest branch.

Simulations for Velocity Estimation

Figure 5:
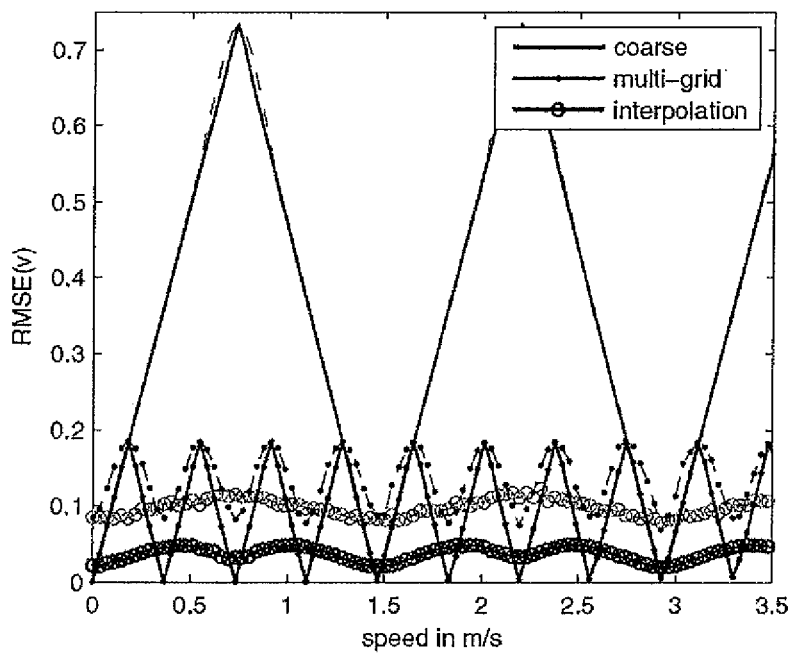
FIG. 5 depicts an average velocity estimation error using varying amounts of correlators and an interpolation between the measured points.

These approaches can be simulated to examine the effectiveness of the velocity estimation of the different approaches described above. For example, if $K_0=512$, B=12 kHz, and the oversampling factor of $\lambda=8$, then the coarse grid spacing can be set as $\Delta a = \Delta v/c$, where $\Delta v$ is 1.46 m/s. A plot using these parameters is shown in FIG. 5. More particularly, FIG. 5 shows a plot of average velocity estimation error using varying amounts of correlators and an interpolation between the measured points, wherein $\gamma=0$ dB (dashed lines) and $\gamma=10$ dB (thick full lines). As can been seen in FIG. 5, the root mean square error of the speed estimates $\hat{v}=c\hat{a}$, at two SNRs of 0 dB and 10 dB. Of note, FIG. 5 shows a "saw-tooth" shape for the coarse estimates, and the SNR decrease has little impact on this shape. Therefore, this may suggest that the probability of not finding the closest branch is negligible and the dominating error is the quantization to the coarse grid.

After detection of the coarse-grid search, another six self-correlators with spacing of $\Delta v=0.366$ m/s to search around the estimated Doppler scale from the previous stage can be used. As shown in FIG. 5, much improved estimates can be obtained. In fact, in this exemplary embodiment, the achieved accuracy exceeds the mismatch specification set earlier at 0.3-0.5 m/s. FIG. 5 also shows that more degradation of the sawtooth shape shows up at low SNR, which is reasonable. Further, FIG. 5 shows the separation in tentative Doppler scales between correlators diminishes, and neighboring correlators will have very similar outputs. Further, FIG. 5 shows the RMSE for velocity estimation with interpolation after the coarse grid search with $\Delta v=1.46$ m/s. It is noted that the interpolation approach proves to be very effective.

Experimental Work

Signal Design for Underwater Experiments

When the transmitter and the receiver are stationary, Doppler scale estimation is not needed and only one self-correlation branch is necessary at the exemplary receiver provided for above. In fact, the detection and coarse synchronization algorithms based on one branch have been used in the PC- and DSP-based multicarrier modem prototypes. See, e.g., H. Yan, S. Zhou, Z. Shi, and B. Li, "A DSP implementation of OFDM acoustic modem," in *Proc. of the ACM International Workshop on Under Water Networks (WUWNet)*, Montreal, Quebec, Canada, September 2007; and S. Mason, R. Anstett, N. Anicette, and S. Zhou, "A broadband underwater acoustic modem implementation using coherent OFDM," in *Proc. National Conference for Undergraduate Research (NCUR)*, San Rafael, Calif., April 2007.

Figure 10:
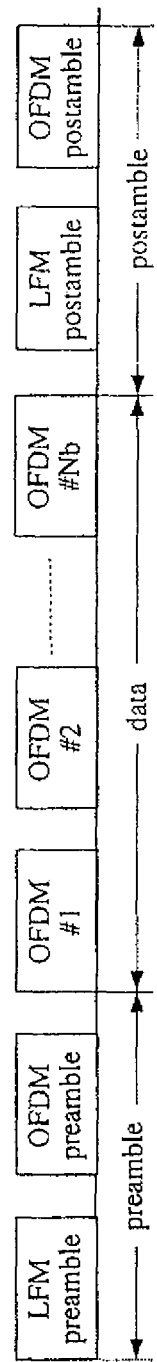
FIG. 10 depicts the structure of a data packet used in an experiment.

However, as opposed to when the transmitter and the receiver are stationary, data was collected and analyzed from an experiment at Buzzards Bay, Mass. on Dec. 15, 2006 using a fast moving transmitter. The same data set was used previously in order to demonstrate the capability of OFDM reception in a dynamic setup, where Doppler scale estimation was done based on the measured time difference between the LFM pre- and postamble. See, B. Li, S. Zhou, M. Stojanovic, L. Freitag, and P. Willet, "Multicarrier communications over underwater acoustic channels with nonuniform Doppler shifts," *IEEE J. Oceanic Eng.*, vol. 33, no. 2, April 2008. The used packet structure that was used in the experiments is shown in FIG. 10. As shown in FIG. 10, each packet contains multiple OFDM blocks. A total of 21 packet transmissions were conducted with a transmitter that was initially moving towards the receiver and eventually passed by the receiver towards the completion of the transmission. A detailed description of the experiments can be found in B. Li, S. Zhou, M. Stojanovic, L. Freitag, and P. Willett, "Multicarrier communication over underwater acoustic channels with nonuniform Doppler shifts," *IEEE J. Ocean. Eng.*, vol. 33, no. 2, April 2008, the entire contents of which is expressly incorporated by reference herein.

Doppler scale estimation was completed and was based on the measured time difference between the LFM pre- and postamble. This scheme showed good performance, as after Doppler scale compensation via resampling the data could be decoded with reasonable BER. However, the main drawback to such a scheme is that the whole packet needed to be buffered before data processing. For example, a packet contained 32 OFDM blocks with K=1024 subcarriers where the packet duration was about 3.8 s. Buffering the 3.8 seconds of data before actual decoding introduced excessive processing delays.

Figure 11A:
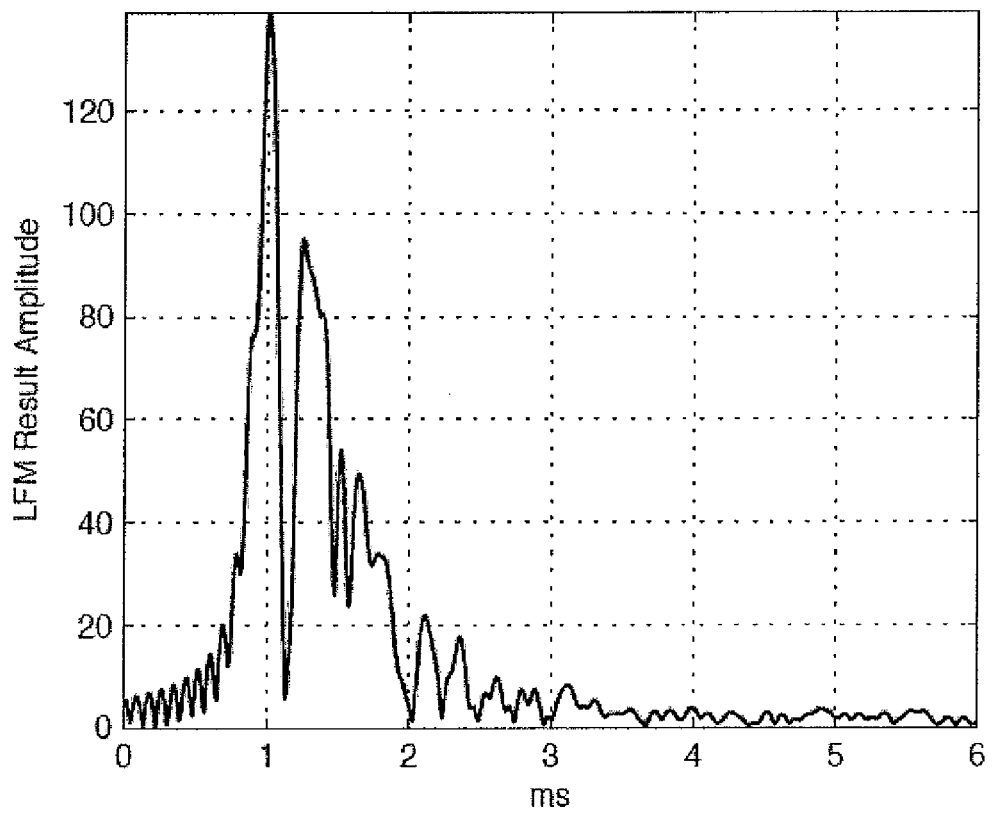
FIG. 11a depicts a matched filter output for an exemplary LFM preamble.
Figure 11B:
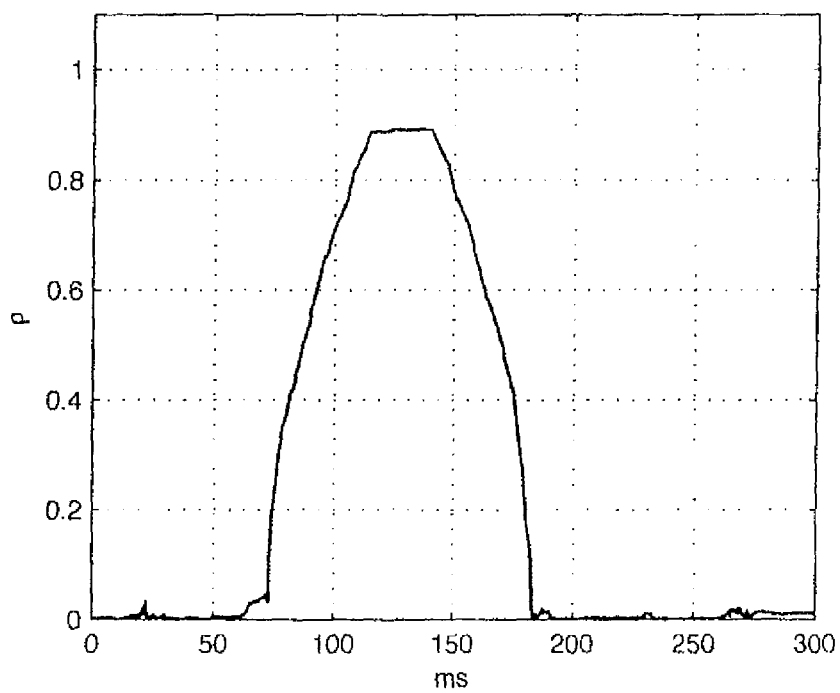
FIG. 11b depicts the output of an exemplary OFDM self-correlator.

In contrast, FIGS. 11a and 11b show a comparison of the timing metrics for a matched filter using the LFM waveform with the proposed systems/methods of the present disclosure. FIGS. 11a and 11b show that the channel energy is fairly constrained within the first 2-3 ms, and the plateau observed at the self-correlator output is almost of length $T_{cp}$, which in this case is 25.6 ms.

Figure 6A:
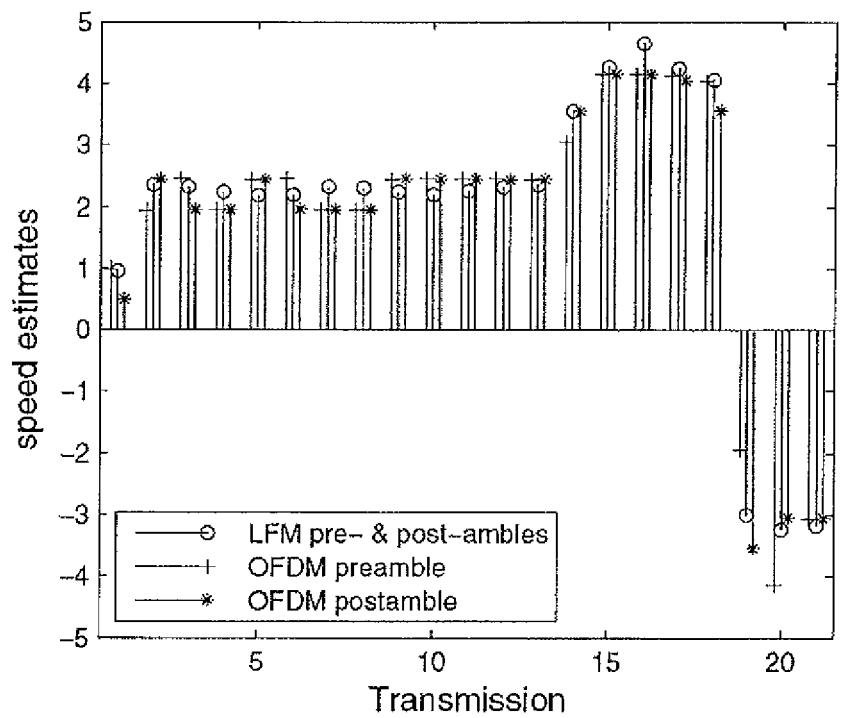
FIG. 6a depicts a comparison of LFM pre- and post-ambles, an OFDM preamble and an OFDM postamble velocity estimation based techniques for 21 transmissions.
Figure 6B:
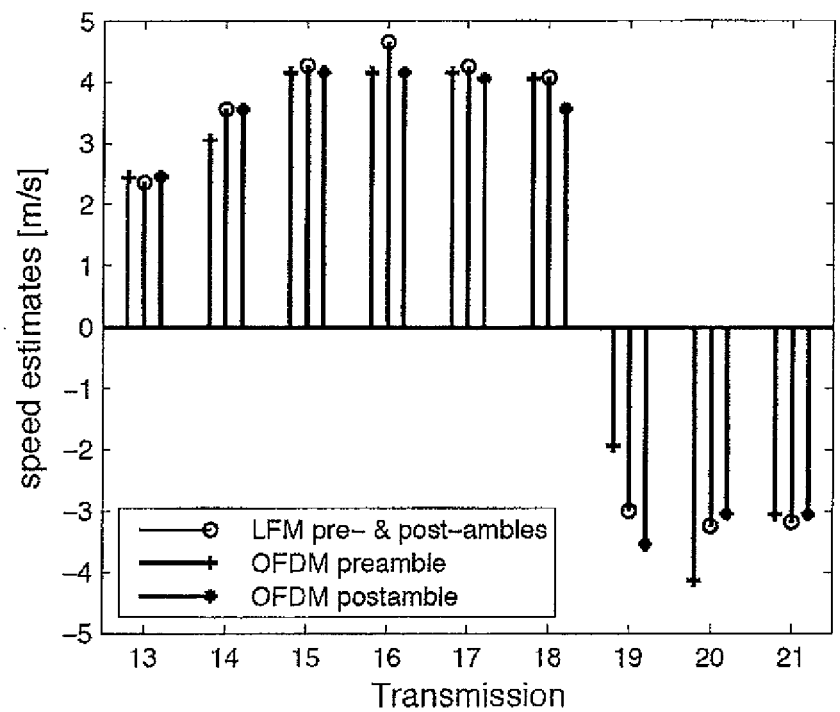
FIG. 6b is an exploded view of FIG. 6a showing transmissions 13 through 21.

The Doppler scale/relative speed estimation accuracy between the two schemes were also compared. FIG. 6a depicts the plot of relative velocity estimates between the sender and receiver, and since an OFDM preamble and postamble were available, both estimates were included. Even though the postamble would not be used for decoding purposes because it does not provide real-time operation, it gives insight about the results. FIG. 6b zooms in on the transmissions of FIG. 6a where the Doppler scale changes dynamically (e.g., transmissions 13-21). Transmissions 13-21 occurred when the transmitter passed by the receiver's location—approximately transmission 19. As the Doppler scale is assumed constant during each transmission, this scenario may be the most challenging transmissions to decode.

FIG. 6b shows that generally the speed estimates are quite accurate. Of note, the accuracy of the proposed approach (which uses a point estimate) is comparable to the accuracy of previous approaches which use the duration of a complete transmission. Since the experiment used a large number of OFDM blocks per transmission (32 blocks for the case of 1024 subcarriers resulting a packet duration of 3.8 s), the time-varying nature of the actual Doppler speed is reflected differently in the two approaches. In reference to transmission 14, 16 or 20 of FIGS. 6a and 6b, the estimates for the LFM-based result is not the average between the OFDM pre- and postamble point estimates. It was observed that the new proposed approach differs from the previous approach by no more than 1 knot (0.5 m/s) for any transmission.

Figure 7:
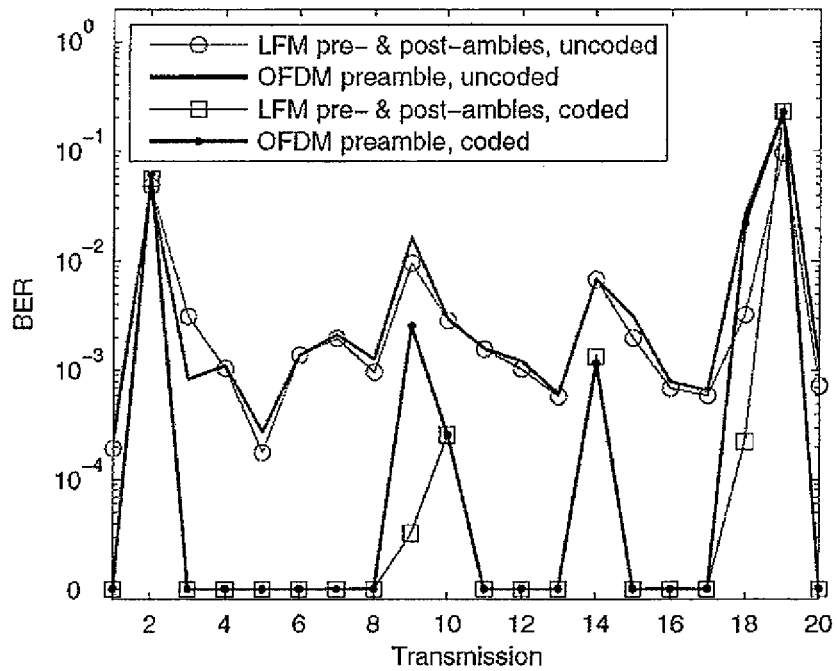
FIG. 7 depicts a comparison of coded and uncoded bit error rates based on LFM pre- and post-ambles and an OFDM preamble.

A comparison on the BER performance was also carried out, where QPSK modulation and a 16-state rate ⅔ convolutional code was used in the data set from B. Li, S. Zhou, M. Stojanovic, L. Freitag, and P. Willet, "Multicarrier communications over underwater acoustic channels with nonuniform Doppler shifts," *IEEE J. Oceanic Eng.*, vol. 33, no. 2, April 2008, which is expressly incorporated by reference herein in its entirety. Demodulation and decoding were completed twice for each packet transmission—once using the Doppler scale estimate obtained from the LFM method and once using the estimate based on the OFDM preamble only. FIG. 7 shows a comparison of the uncoded and coded bit error rates wherein decoding is performed after resampling with either the offline speed estimates based on the LFM pre- and postambles or based on the new speed estimate for online and/or real-time processing. As can be seen from FIG. 7, similar uncoded and coded BER results were obtained. However, of note, the proposed systems/methods of the present disclosure avoids the need to buffer the whole packet before data demodulation, thereby rendering it appropriate for online and/or real-time processing. The instances where differences in BERs are observed in FIG. 7 are with transmissions 9 and 18. There are several environmental factors which could have contributed to this anomaly, including, without limitation, ship noise and/or a rapid rate of change in velocity. It is also possible that since the previous LFM method for velocity estimation uses the average compression/dilation over the entire transmission, the new approach proposed herein, which only relies on one preamble sequence, is more susceptible to rapid changes in velocity during a transmission. However, it is contemplated that for scenarios where the Doppler scale changes rapidly, the packet duration can be decreased, or multiple synchronization blocks are inserted into the transmission, to allow for more frequent updates of the Doppler scale estimates.

The apparatus, systems and methods of the present disclosure are typically implemented with conventional processing technology. Thus, programming is typically provided for operation on a processor, such programming being adapted to perform the noted operations for processing an acoustic signal in the manner disclosed herein. The processor may communicate with data storage and/or other processing elements, e.g., over a network, as is well known to persons skilled in the art. Thus, in exemplary implementations of the present disclosure, programming is provided that is adapted for a multicarrier based underwater acoustic (UWA) signal, such that a UWA signal is detected, synchronized and Doppler scale estimated according to the disclosed apparatus, systems and methods, and may be adapted, for example, to online and/or real-time receivers for UWA communication.

Although the systems and methods of the present disclosure have been described with reference to exemplary embodiments thereof, the present disclosure is not limited to such exemplary embodiments and/or implementations. Rather, the systems and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure. Accordingly, it is appropriate that the appended claims be construed broadly and in a manner consistent with the scope of the disclosure.

What is claimed:

1. A method for processing an underwater acoustic (UWA) signal, the method comprising the steps of:
    (a) detecting a multi-carrier based UWA signal with a receiver that includes a bank of parallel branches, with each branch having a self-correlator matched to a different waveform scaling factor, the UWA signal including one or more packets;
    (b) synchronizing the received UWA signal on the branch that yields the maximum correlation metric; and
    (c) providing a Doppler scale estimation of the received UWA signal.

2. The method according to claim 1, further comprising the step of determining Doppler scale spacing in the parallel self-correlator structure.

3. The method according to claim 2, wherein the step of determining the Doppler scale spacing includes analyzing false alarm and detection probabilities of a single branch as a function of a threshold and the Doppler scale.

4. The method according to claim 1, further comprising the step of demodulating the UWA signal, and wherein the one or more packets are not buffered before demodulation.

5. The method according to claim 1 further including the steps of:
(i) resampling in a passband with a resampling factor; and
(ii) performing fine Doppler shift compensation to obtain an estimated Doppler shift.

6. The method according to claim 1, wherein each of the one or more packets includes a preamble followed by data transmission.

7. The method according to claim 6, wherein each preamble includes two identical orthogonal frequency division multiplexing (OFDM) symbols preceded by a cyclic prefix (CP).

8. The method according to claim 1, wherein detection of the UWA signal is declared when any of the branches leads to a correlation metric larger than a pre-defined threshold.

9. The method according to claim 1, wherein the branch that leads to the largest correlation metric defines a base repetition period.

10. The method according to claim 1, wherein the Doppler scale estimation includes a Doppler scale factor, and wherein the Doppler scale factor is determined at least in part by a base repetition period.

11. The method according to claim 1, wherein the branch that leads to the largest correlation metric defines a coarse synchronization point.

12. The method according to claim 1, wherein the bank of parallel branches compensates for time compression and dilation in UWA signals.

13. The method according to claim 1, wherein the received UWA signal is converted to baseband before processing.

14. An underwater acoustic (UWA) receiver unit comprising:
(a) at least one receiving element configured to receive at least one multi-carrier based UWA signal, the at least one receiving element including a bank of parallel branches, with each branch having a self-correlator matched to a different waveform scaling factor, the at least one UWA signal including one or more packets; and
(b) a processor associated with the at least one receiving element, the processor adapted and programmed to: (i) detect the at least one UWA signal, (ii) synchronize the at least one UWA signal, and (iii) provide a Doppler scale estimation of the at least one UWA signal.

15. The unit according to claim 14, wherein the processor is further programmed to determine Doppler scale spacing in the parallel self-correlator structure.

16. The unit according to claim 15, wherein the processor determines the Doppler scale spacing by analyzing false alarm and detection probabilities of a single branch as a function of a threshold and the Doppler scale.

17. The unit according to claim 14, wherein the one or more packets are not buffered before demodulating the at least one UWA signal.

18. The unit according to claim 14, wherein the processor is further programmed to mitigate channel Doppler effect; and wherein the channel Doppler effect is mitigated by: (i) resampling a passband with a resampling factor; and (ii) performing fine Doppler shift compensation to obtain an estimated Doppler shift.

19. The unit according to claim 14, wherein each of the one or more packets includes a preamble followed by data transmission.

20. The unit according to claim 19, wherein each preamble includes two identical orthogonal frequency division multiplexing (OFDM) symbols preceded by a cyclic prefix (CP).

21. The unit according to claim 14, wherein detection of the at least one UWA signal is declared when any of the branches leads to a correlation metric larger than a pre-defined threshold.

22. The unit according to claim 14, wherein synchronization of the at least one UWA signal is performed on the branch that leads to the largest correlation metric.

23. The unit according to claim 22, wherein the branch that leads to the largest correlation metric defines a base repetition period.

24. The unit according to claim 14, wherein the Doppler scale estimation includes a Doppler scale factor, and wherein the Doppler scale factor is determined at least in part by a base repetition period.

25. The unit according to claim 22, wherein the branch that leads to the largest correlation metric defines a coarse synchronization point.

26. The unit according to claim 14, wherein the bank of parallel branches compensates for time compression and dilation in the at least one UWA signal.

27. The unit according to claim 14, wherein the received at least one UWA signal is converted to baseband before processing by the processor.

28. An underwater acoustic (UWA) communications system comprising:
(a) a transmitter unit adapted to transmit a multi-carrier based UWA signal, the UWA signal including one or more packets;
(b) at least one receiving element adapted to receive the multi-carrier based UWA signal, the at least one receiving element including a bank of parallel branches, with each branch having a self-correlator matched to a different waveform scaling factor; and
(c) a processor associated with the at least one receiving element, the processor programmed to: (i) detect the UWA signal, (ii) synchronize the UWA signal, and (iii) provide a Doppler scale estimation of the UWA signal.

29. The system according to claim 28, wherein the processor is further programmed to determine Doppler scale spacing in the parallel self-correlator structure.

30. The system according to claim 29, wherein the processor determines the Doppler scale spacing by analyzing false alarm and detection probabilities of a single branch as a function of a threshold and the Doppler scale.

31. The system according to claim 28, wherein the one or more packets are not buffered before demodulating the UWA signal.

32. The system according to claim 28, wherein the processor is further programmed to mitigate channel Doppler effect; and wherein the channel Doppler effect is mitigated by: (i) resampling a passband with a resampling factor; and (ii) performing fine Doppler shift compensation to obtain an estimated Doppler shift.

33. The system according to claim 28, wherein each of the one or more packets includes a preamble followed by data transmission.

34. The system according to claim 33, wherein each preamble includes two identical orthogonal frequency division multiplexing (OFDM) symbols preceded by a cyclic prefix (CP).

35. The system according to claim 28, wherein detection of the UWA signal is declared when any of the branches leads to a correlation metric larger than a pre-defined threshold.

36. The system according to claim 28, wherein synchronization of the UWA signal is performed on the branch that leads to the largest correlation metric.

37. The system according to claim 36, wherein the branch that leads to the largest correlation metric defines a base repetition period.

38. The system according to claim 28, wherein the Doppler scale estimation includes a Doppler scale factor, and wherein the Doppler scale factor is determined at least in part by a base repetition period.

39. The system according to claim 36, wherein the branch that leads to the largest correlation metric defines a coarse synchronization point.

40. The system according to claim 28, wherein the bank of parallel branches compensates for time compression and dilation in the UWA signal.

41. The system according to claim 28, wherein the received signal is converted to baseband before processing by the processor.

* * * * *